(12) United States Patent
Tachibana

(10) Patent No.: US 9,715,354 B2
(45) Date of Patent: Jul. 25, 2017

(54) PRINTING APPARATUS FOR DETECTING A MISMATCH BETWEEN A DETECTED SIZE OF AN ENVELOPE AND A USER ENTERED SIZE OF AN ENVELOPE

(71) Applicant: CANON KABUSHIKI KAISHA, Tokyo (JP)

(72) Inventor: Yoshiro Tachibana, Inagi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/450,096

(22) Filed: Aug. 1, 2014

(65) Prior Publication Data

US 2015/0036172 A1 Feb. 5, 2015

(30) Foreign Application Priority Data

Aug. 5, 2013 (JP) ................ 2013-162232

(51) Int. Cl.

| | | |
|---|---|---|
| *G06F 3/12* | (2006.01) | |
| *B65H 1/04* | (2006.01) | |
| *B65H 9/00* | (2006.01) | |
| *B65H 7/20* | (2006.01) | |
| *B65H 7/06* | (2006.01) | |
| *G03G 15/00* | (2006.01) | |

(52) U.S. Cl.
CPC ............ *G06F 3/121* (2013.01); *B65H 1/04* (2013.01); *B65H 7/06* (2013.01); *B65H 7/20* (2013.01); *B65H 9/00* (2013.01); *G03G 15/502* (2013.01); *G06F 3/1234* (2013.01); *G03G 2215/00514* (2013.01)

(58) Field of Classification Search
CPC ...... G06F 3/121; G06F 3/1234; G03G 15/502; B65H 7/20; B65H 7/06; B65H 9/00
See application file for complete search history.

(56) References Cited

U.S. PATENT DOCUMENTS

| | | | |
|---|---|---|---|
| 2006/0072139 A1* | 4/2006 | Hult ................. | B41J 11/003 358/1.13 |
| 2006/0132584 A1* | 6/2006 | Jobmann ............ | B26D 1/626 347/219 |
| 2006/0249894 A1* | 11/2006 | Lisena ............... | B65H 5/16 271/96 |
| 2010/0166484 A1* | 7/2010 | Edwards ............ | B41J 11/003 400/642 |

(Continued)

FOREIGN PATENT DOCUMENTS

| | | |
|---|---|---|
| CN | 201151240 Y | 11/2008 |
| CN | 101850669 A | 10/2010 |

(Continued)

*Primary Examiner* — Benjamin O Dulaney
(74) *Attorney, Agent, or Firm* — Canon USA, Inc. I.P. Division

(57) ABSTRACT

A printing apparatus includes a holding unit configured to hold an envelope having a flap, a detection unit configured to detect a guide width between two guides provided in the holding unit, an acceptance unit configured to accept information about envelope size and flap length from a user, and a display control unit configured to determine whether to perform an error notification display based on the guide width detected by the detection unit as well as based on the envelope size and the flap length accepted by the acceptance unit.

16 Claims, 27 Drawing Sheets

(56) References Cited

U.S. PATENT DOCUMENTS

| | | | |
|---|---|---|---|
| 2011/0184889 A1* | 7/2011 | Tokita | B65H 1/00 705/414 |
| 2012/0200881 A1* | 8/2012 | Yamato | G06K 15/1809 358/1.15 |
| 2013/0140767 A1* | 6/2013 | Inui | B65H 5/00 271/264 |

FOREIGN PATENT DOCUMENTS

| | | |
|---|---|---|
| CN | 103129173 A | 6/2013 |
| CN | 103129182 A | 6/2013 |
| CN | 103182859 A | 7/2013 |
| JP | 8-67410 A | 3/1996 |
| JP | 2005-56001 A | 3/2005 |
| JP | 2009-298561 A | 12/2009 |

* cited by examiner

100 MFP

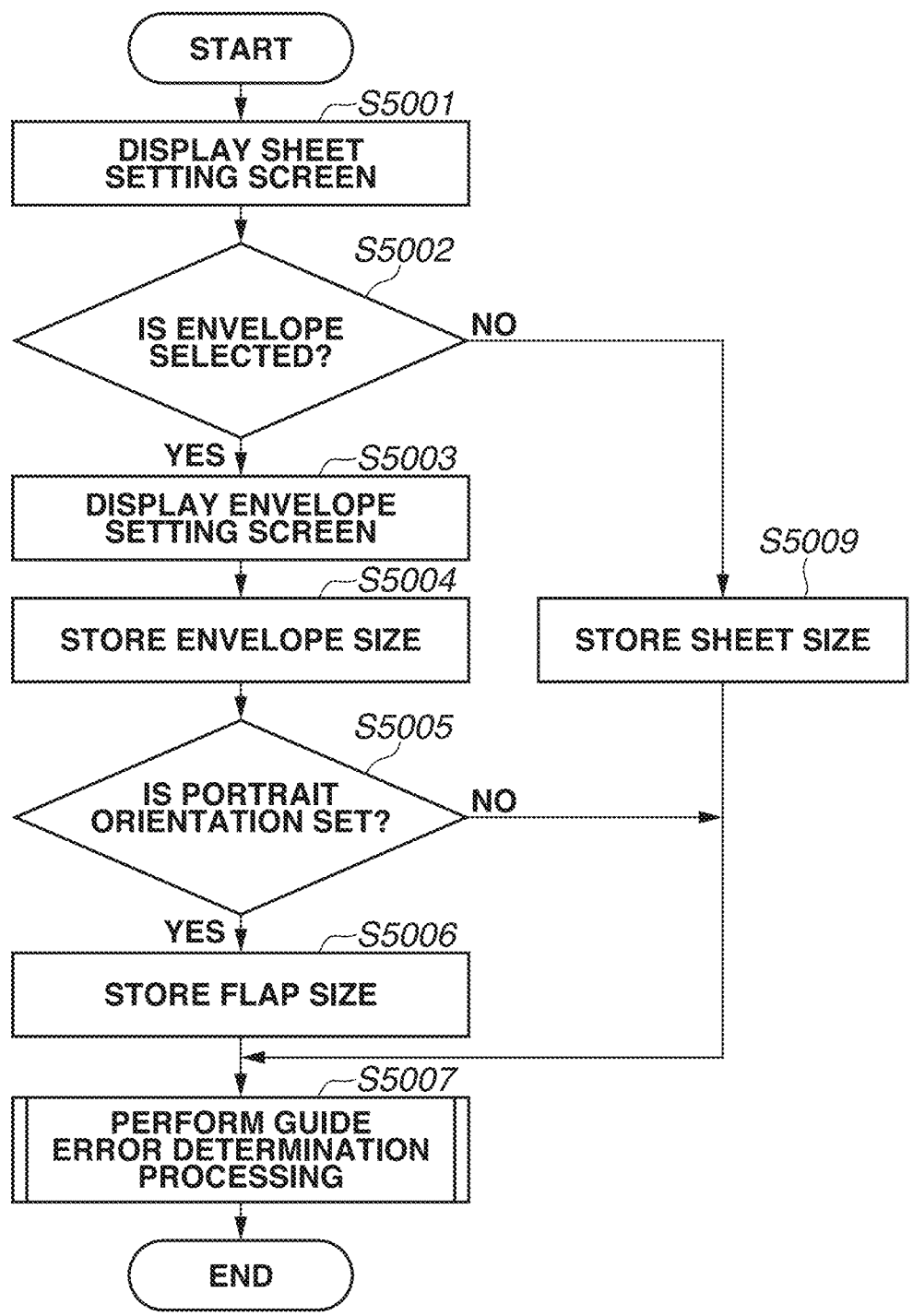

< ENVELOPE: LANDSCAPE ORIENTATION >
ENVELOPE TYPE IS SELECTABLE.

SETTING METHOD: (1) PRESS

| NAGAGATA #3 | No.10(COM10) |
| YOUGATA #3 | ISO-C5 |
| KAKUGATA #2 | DL |
| | Monarch |

808 — TO PORTRAIT ORIENTATION

× CANCEL    OK

< ENVELOPE: PORTRAIT ORIENTATION >
ENVELOPE TYPE IS SELECTABLE.

SETTING METHOD: (1) PRESS

| NAGAGATA #3 | No.10(COM10) |
| YOUGATA #3 | ISO-C5 |
| | DL |
| | Monarch |

TO LANDSCAPE ORIENTATION

× CANCEL    809 — NEXT ▶

FIG.10A 1801

ITEM TO BE SET IS SELECTABLE.

- ENVIRONMENT SETTING
  - PAPER SETTING
  - REGISTRATION OF FREQUENTLY USED PAPER (MANUAL FEEDING TRAY) — 1811
  - MANUAL FEEDING PAPER DEFAULT SETTING
    ▲ EACH TIME DESIGNATION MODE — 1812
  - REGISTRATION OF USER SETTING SIZE

▲ TO TOP

2/2 ◀ ▶

CLOSE

FIG.10B 1802

< DEFAULT SETTING OF MANUAL FEEDING PAPER >

FIXED MODE | EACH TIME DESIGNATION MODE

- PAPER SIZE · ENVELOPE
- PAPER TYPE  ☑

REGISTRATION ▲

✕ CANCEL    OK

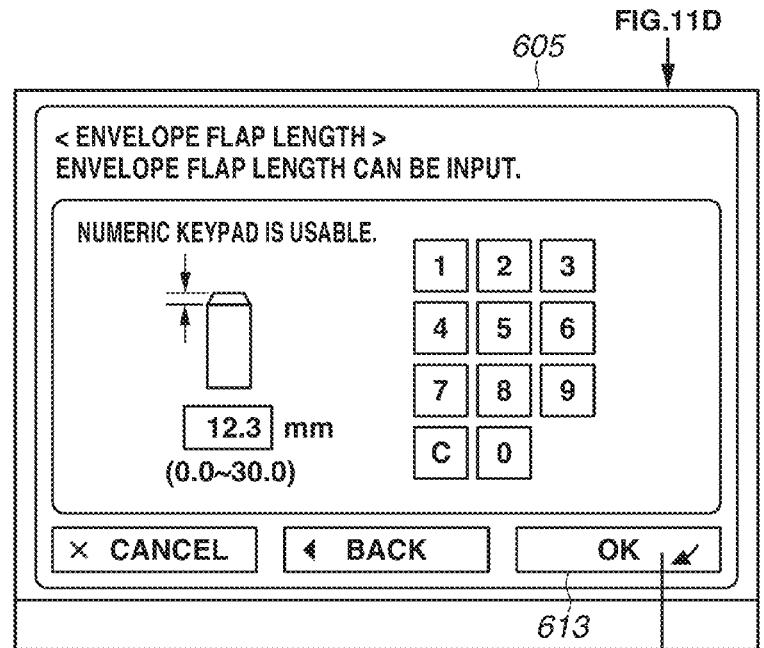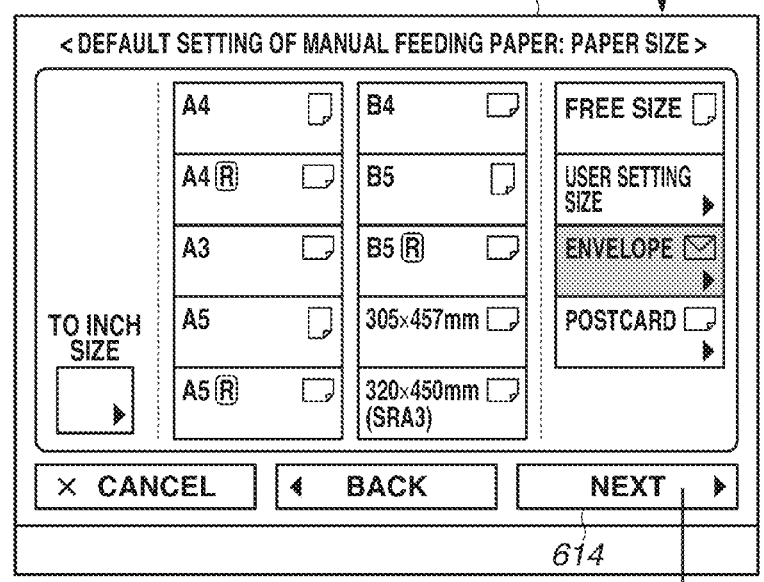

FIG.12E

< ENVELOPE FLAP LENGTH >
ENVELOPE FLAP LENGTH CAN BE INPUT.

NUMERIC KEYPAD IS USABLE.

| 1 | 2 | 3 |
| 4 | 5 | 6 |
| 7 | 8 | 9 |
| C | 0 |   |

20.0 mm
(0.0~30.0)

× CANCEL    ◄ BACK    OK 705
713
FIG.12D

FIG.12F

< DEFAULT SETTING OF MANUAL FEEDING PAPER: PAPER SIZE >

| A4 | B4 | FREE SIZE |
| A4 R | B5 | USER SETTING SIZE ► |
| A3 | B5 R | ENVELOPE ► |
| A5 | 305×457mm | POSTCARD ► |
| A5 R | 320×450mm (SRA3) | |

TO INCH SIZE ►

× CANCEL    ◄ BACK    NEXT ►

<REGISTRATION OF FREQUENTLY USED PAPER (MANUAL FEEDING TRAY): PAPER TYPE>
PAPER TYPE IS SELECTABLE.

| ● ALL ▼ | REGISTRATION ORDER ▼ | 6/7 |
|---|---|---|
| NAME | GRAMMAGE | |
| ☐ TWO-SIDED COATED PAPER 1 (106~128 g/m²) | 110 g/m² | |
| ☐ TWO-SIDED COATED PAPER 2 (129~163 g/m²) | 135 g/m² | |
| ☐ TWO-SIDED COATED PAPER 3 (164~220 g/m²) | 180 g/m² | |
| ✉ ENVELOPE (80~90 g/m²) | 85 g/m² | |

▶ TO SIMPLE SETTING    DETAILED INFORMATION ▶

✕ CANCEL    ◀ BACK    OK ◢

< FREQUENTLY USED PAPER >
SELECT PAPER TO BE CALLED AND PRESS OK.

· PRESENTLY SELECTED PAPER INFORMATION
▶ P1   ✉ NAGAGATA #3: PORTRAIT ORIENTATION

☐ P1    ☐ P2    ☐ P3
☐ P4    ☐ P5    ☐ P6

REGISTRATION    ☐ 2ND PAGE OF TWO-SIDED PRINT    1/5 ▼ ▲

OTHER PAPER    OK ◢

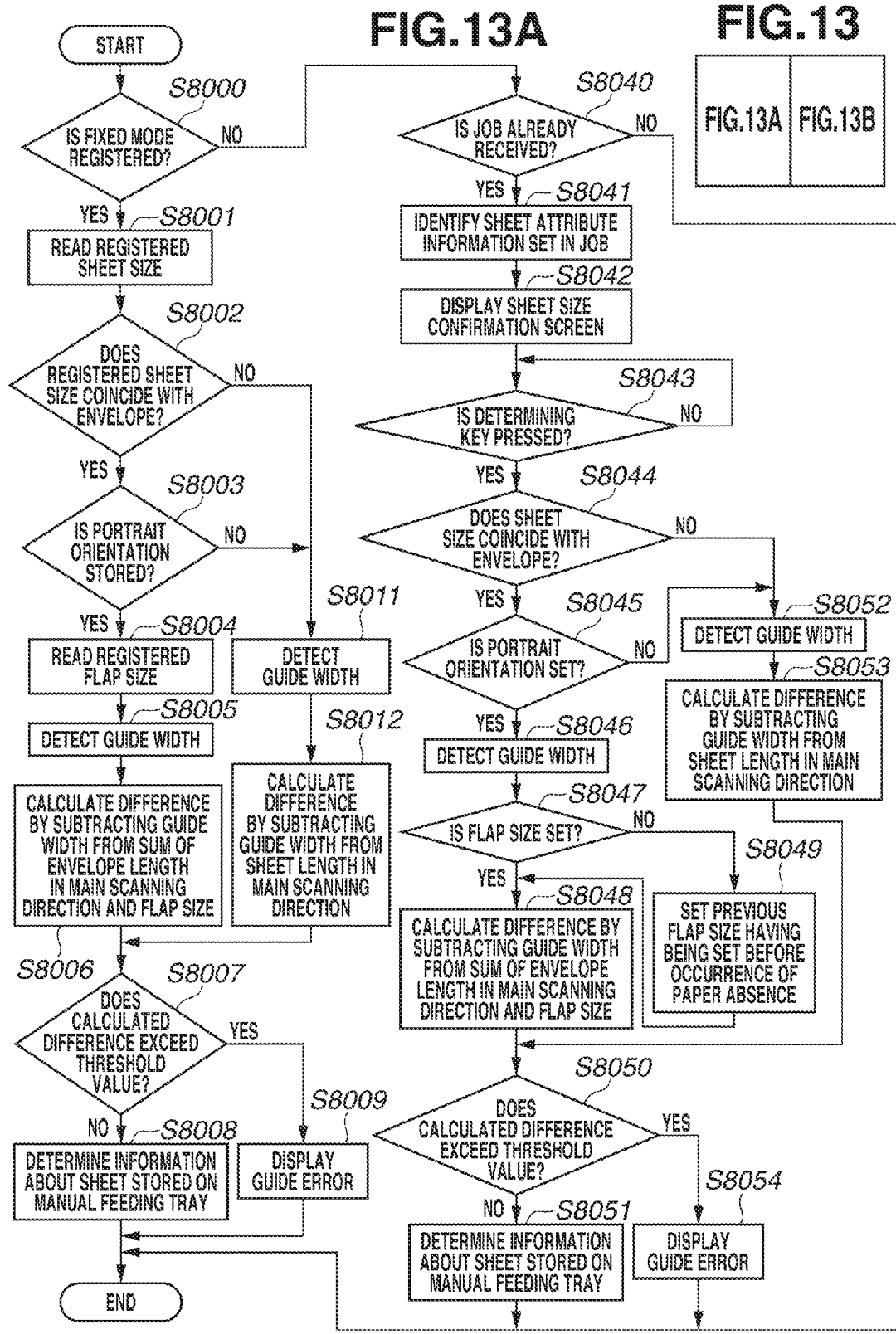

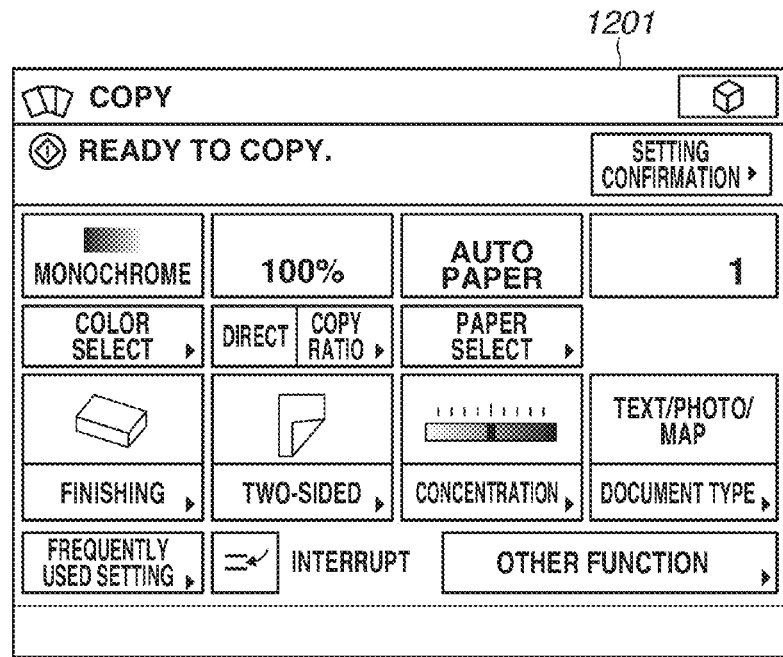
FIG.14A
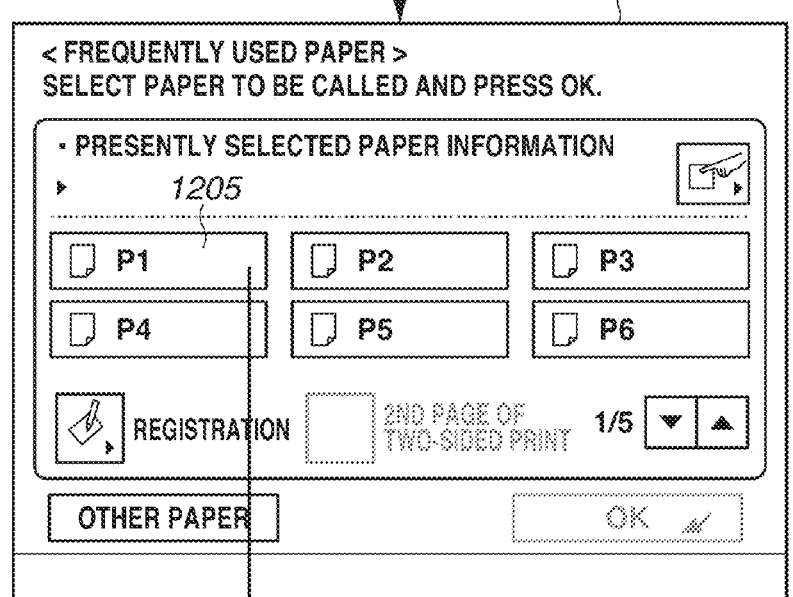
FIG.14B
FIG.14C

PRINTING APPARATUS FOR DETECTING A MISMATCH BETWEEN A DETECTED SIZE OF AN ENVELOPE AND A USER ENTERED SIZE OF AN ENVELOPE

BACKGROUND OF THE INVENTION

Field of the Invention

The present invention relates to a printing apparatus, an information processing apparatus, a printing apparatus control method, and a storage medium.

Description of the Related Art

As discussed in Japanese Patent Application Laid-Open No. 2005-56001, a conventional printing apparatus includes a sheet holding unit (e.g., a manual feeding tray) on which an envelope can be held and is configured to print an image on the envelope fed from the sheet holding unit. As illustrated in FIG. 16A, a general envelope includes a foldable protruding portion that is referred to as a flap. The conventional printing apparatus can hold an envelope placed on the sheet holding unit in such a manner that the flap is positioned on a rear end side in a sheet conveyance direction, as illustrated in FIG. 16B, and causes a user to designate a size "a×b" as an image print region.

Further, as discussed in Japanese Patent Application Laid-Open No. 8-67410, a conventional printing apparatus can detect a guide width representing two guides provided in the manual feeding tray and can perform an error notification display if the detected width is different from a width input beforehand by a user to encourage the user to adjust the positions of the guides to have a correct width.

According to the above-mentioned conventional printing apparatus, the flap is positioned on the rear end side in the conveyance direction when the envelope is placed in the sheet holding unit. However, according to another printing method, it is feasible to set the flap of an envelope in such a way as to abut against a guide as illustrated in FIG. 16C, to prevent the envelope from wrinkling while the envelope is conveyed.

However, according to a conventional guide error display method, a flap length "c" is not taken into consideration in performing an error notification display. Therefore, when an envelope is placed on the sheet holding unit as illustrated in FIG. 16C, the error notification display may be erroneously performed even though the envelope is correctly placed.

SUMMARY OF THE INVENTION

According to an aspect of the present invention, a printing apparatus includes a holding unit configured to hold an envelope having a flap, a detection unit configured to detect a guide width between two guides provided in the holding unit, an acceptance unit configured to accept information about envelope size and flap length from a user, and a display control unit configured to determines whether to perform an error notification display based on the guide width detected by the detection unit as well as based on the envelope size and the flap length accepted by the acceptance unit.

Further features of the present invention will become apparent from the following description of exemplary embodiments with reference to the attached drawings.

BRIEF DESCRIPTION OF THE DRAWINGS

FIG. 6 is a flowchart illustrating processing that can be performed by the control apparatus of the printing system according to a first exemplary embodiment.

FIGS. 8A to 8F illustrate operation screens according to the first exemplary embodiment.

FIGS. 10A to 10D illustrate operation screens according to a second exemplary embodiment.

FIGS. 11A to 11H illustrate operation screens according to the second exemplary embodiment.

FIGS. 12A to 12H illustrate operation screens according to the second exemplary embodiment.

FIGS. 13A and 13B are flowcharts illustrating processing that can be performed by the control apparatus of the printing system according to the second exemplary embodiment.

FIGS. 14A to 14D illustrate operation screens according to the second exemplary embodiment.

DESCRIPTION OF THE EMBODIMENTS

Various exemplary embodiments, features, and aspects of the invention will be described in detail below with reference to attached drawings.

Figure 1:
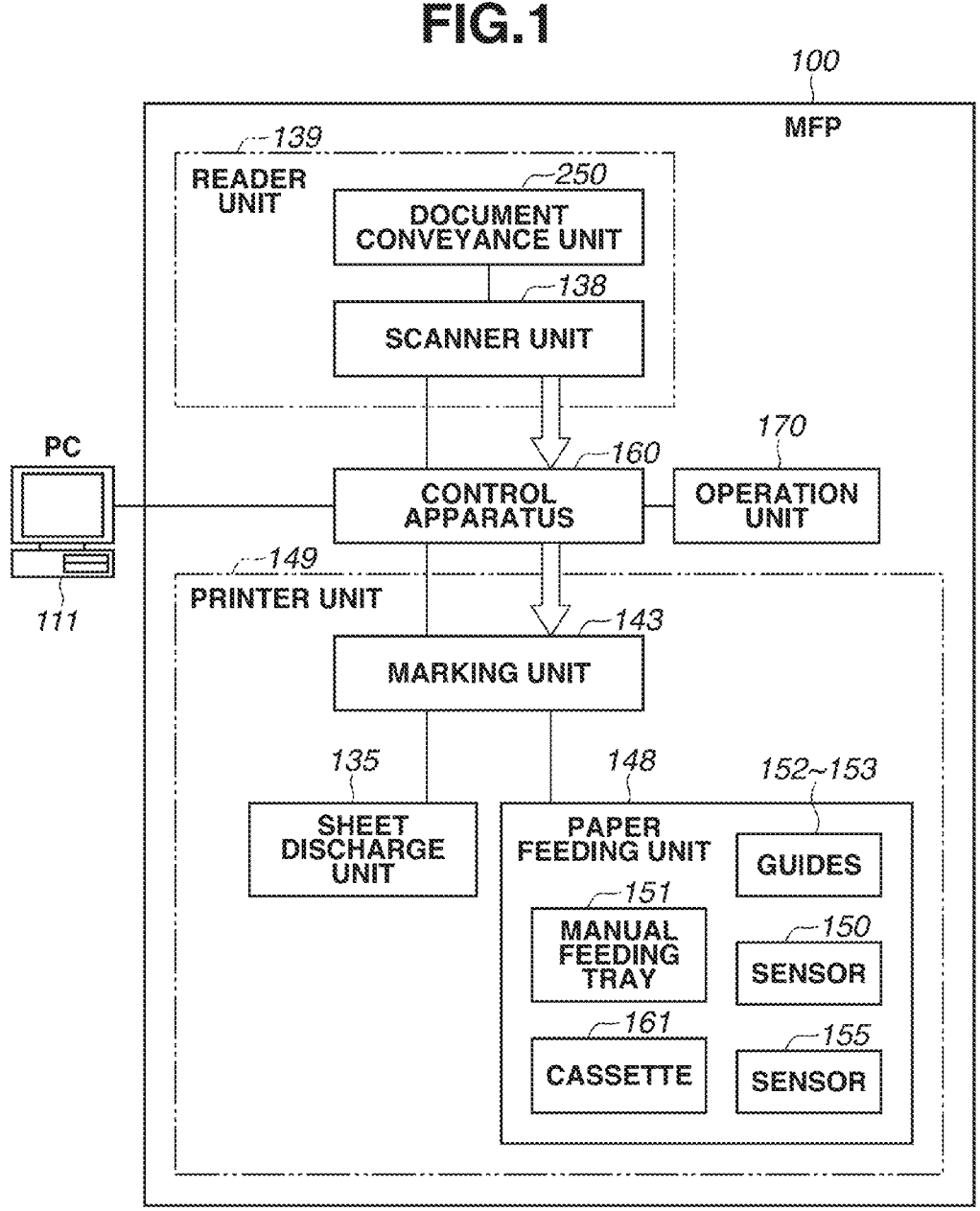
FIG. 1 is a block diagram illustrating a configuration of a printing system according to the present exemplary embodiment.

FIG. 1 illustrates a printing system according to a first exemplary embodiment. The printing system according to the first exemplary embodiment includes a personal computer (PC) 111 and a multi functional peripheral (MFP) 100.

The MFP 100 according to the present exemplary embodiment includes a control apparatus 160, a reader unit 139, a printer unit 149, and an operation unit 170. The reader unit 139, the control apparatus 160, the printer unit 149, and the operation unit 170 are electrically connected to each other and can mutually transmit and receive control commands and data. The printing apparatus according to the present exemplary embodiment is not limited to the above-mentioned MFP and can be replaced by a single functional peripheral (SFP) or any other printing apparatus.

The PC 111 can generate image data using appropriate application software installed thereon and can transmit the generated image data to the MFP 100. In the present exemplary embodiment, the PC 111 is an example of an external information processing apparatus. The PC 111 can be replaced by a portable terminal, such as a personal digital assistant (PDA) or a smartphone.

The MFP 100 is connected to the PC 111 via a wired LAN and can communicate with the PC 111. The medium for connecting the MFP 100 and the PC 111 is not limited to the wired LAN employed in the present exemplary embodiment. For example, the MFP 100 and the PC 111 can be connected via a USB cable. Further, WiFi, Bluetooth (registered trademark), or any other appropriate wireless communication technology is usable to enable the MFP 100 and the PC 111 to communicate with each other.

The control apparatus 160 can comprehensively control the MFP 100. The control apparatus 160 is described in detail below with reference to FIG. 2.

The reader unit 139 includes a scanner unit 138 and a document conveyance unit (DF unit) 250. The scanner unit 138 can read an image of a document and can generate image data representing the read image. The document conveyance unit 250 can convey a document to be read by the scanner unit 138. The image data generated by the scanner unit 138 is input to the control apparatus 160.

The printer unit 149 can print an image on a sheet (which may be referred to as a paper or a recording paper). The printer unit 149 can successively convey sheets supplied from the paper feeding unit 148 to a marking unit 143. The paper feeding unit 148 includes a cassette 161 and a manual feeding tray 151. Further, the paper feeding unit 148 includes guides 152 and 153, which cooperatively sandwich a sheet having been placed on the manual feeding tray 151, and a sensor 150 that can detect the clearance between the guide 152 and the guide 153. Further, the paper feeding unit 148 includes a sensor 155 that can detect the presence of any sheet having been placed on the manual feeding tray 151.

The marking unit 143 can print an image on a sheet supplied from the paper feeding unit 148 based on image data transmitted from the control apparatus 160. The sheet, on which an image has been printed by the marking unit 143, can be output to a sheet discharge unit 135.

The operation unit 170 includes a display unit and hard keys. The display unit includes a liquid crystal display unit and a touch panel sheet adhered to the liquid crystal display unit. The liquid crystal display unit can display various operation screens and can display operational states of the MFP 100. The operation unit 170 can accept a user operation via the operation screen or respective hard keys. The display unit according to the present exemplary embodiment is not limited to the above-mentioned liquid crystal display unit. An organic electro-luminescence device or a plasma display device is usable to display operation screens.

<Detailed Configuration of Control Apparatus>

Next, a detailed configuration of the control apparatus 160 illustrated in FIG. 1 is described in detail below with reference to FIG. 2.

Figure 2:
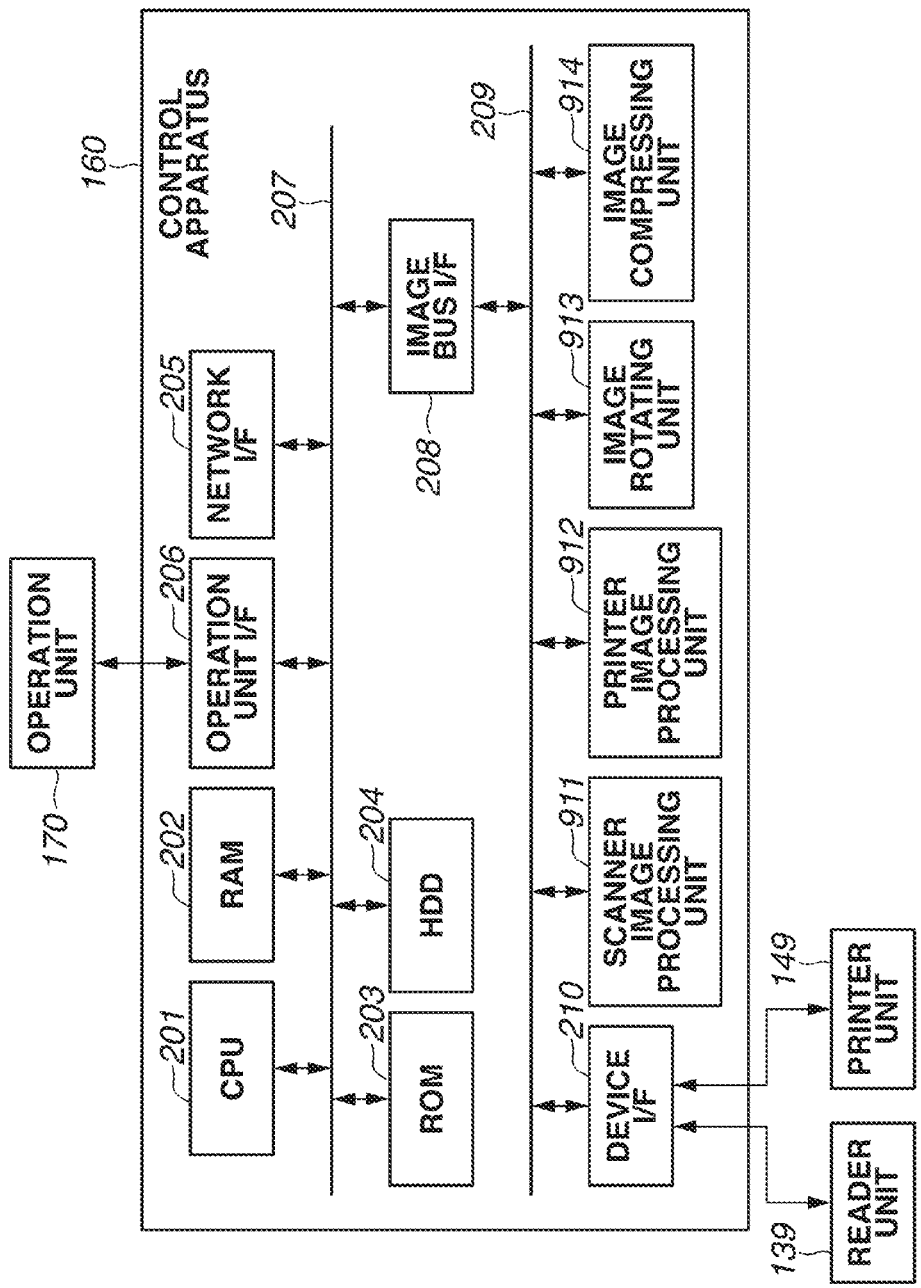
FIG. 2 is a block diagram illustrating a configuration of a control apparatus according to the present exemplary embodiment.

FIG. 2 is a block diagram illustrating a configuration of the control apparatus 160 provided in the apparatus body 100 illustrated in FIG. 1.

The control apparatus 160 includes a central processing unit (CPU) 201 that can execute a program loaded into a random access memory (RAM) 202 from a read only memory (ROM) 203 to control various operations to be performed by the MFP 100.

The RAM 202 is functionally operable as a work area for the CPU 201 and can store various programs and related data.

The ROM 203 stores various programs that can be read and executed by the CPU 201.

A hard disk drive (HDD) 204 stores system software programs and image data. In the present exemplary embodiment, the HDD 204 is an example of a data readable and writable nonvolatile memory. However, the data storage medium for the control apparatus 160 is not limited to the HDD 204 and can be replaced by a solid state drive (SSD) or a Blu-ray disc.

A network interface (I/F) 205 can control communications between the control apparatus 160 and the PC 111.

An operation unit I/F 206 is an interface that can control data communications between the control apparatus 160 and the operation unit 170. The operation unit I/F 206 is configured to receive image data to be displayed on the operation unit 170 and output the image data to the operation unit 170. Further, if a user inputs information to the control apparatus 160 via the operation unit 170, the CPU 201 can receive the input information from the operation unit I/F 206. In the present exemplary embodiment, the CPU 201 controls various display operations to be realized by the operation unit 170. However, the operation unit 170 can be configured to include a dedicated CPU that can control the display of operation screens and image data based on image data received from the CPU 201.

A system bus 207 enables the above-mentioned functional units to transfer information and data. The system bus 207 is connected to an image bus 209 via an image bus I/F 208. A device I/F 210, a scanner image processing unit 911, a printer image processing unit 912, an image rotating unit 913, and an image compressing unit 914 are mutually connected via the image bus 209.

The device I/F 210 can communicate with each of the reader unit 139 and the printer unit 149. The device I/F 210 can control data transmission/reception between the control apparatus 160 and each of the reader unit 139 and the printer unit 149.

The scanner image processing unit 911 can perform image processing (e.g., image noise removal, masking/trimming, and gradation conversion) according to an instruction from the CPU 201.

The printer image processing unit 912 can perform image processing (e.g., image layout processing and resolution conversion processing) on a sheet to be printed.

The image rotating unit 913 can perform rotation processing on image data.

The image compressing unit 914 can perform JPEG compression/expansion processing on multi-value image data and can perform JBIG, MMR, MR, or MH compression/expansion processing on binary image data.

Figure 3:
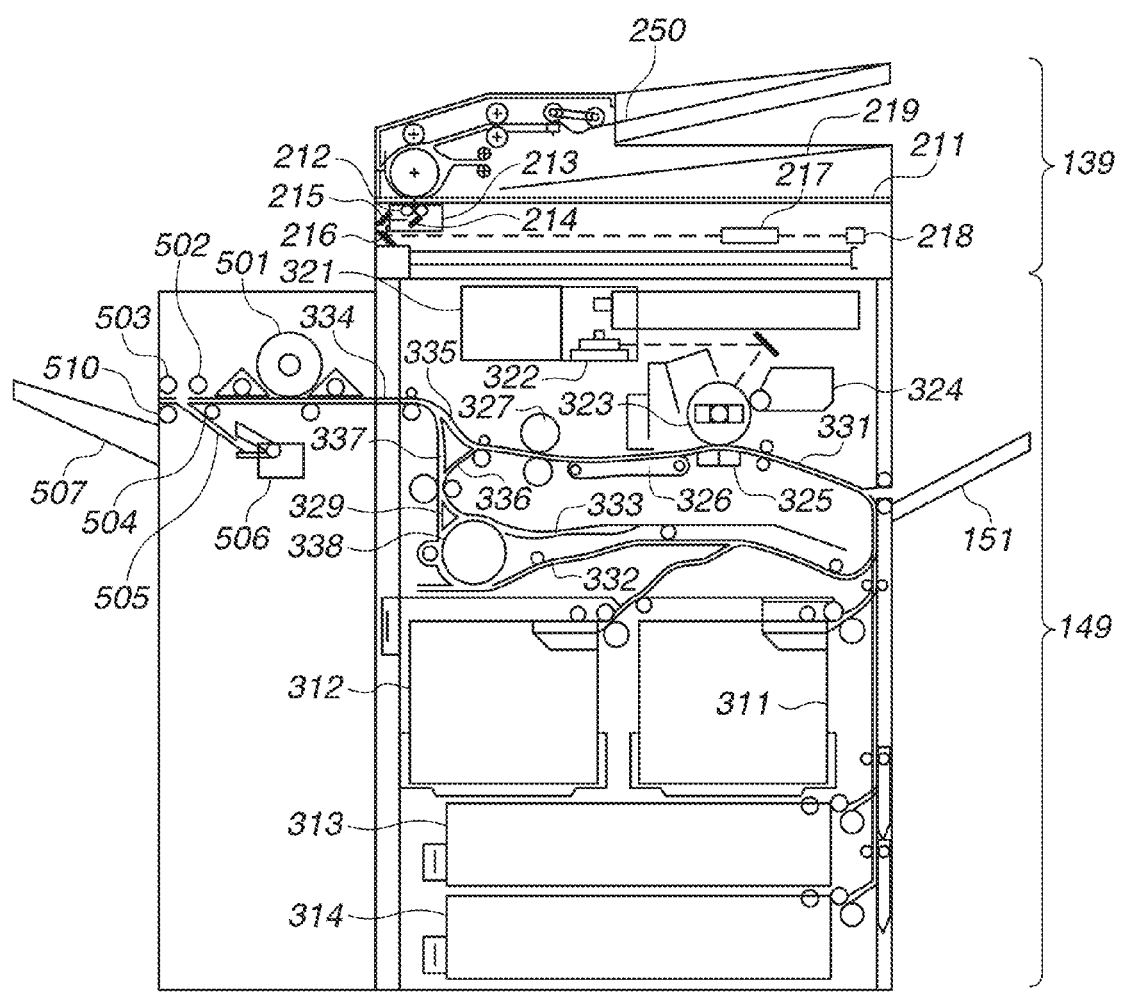
FIG. 3 is a cross-sectional view illustrating a configuration of an MFP according to the present exemplary embodiment.

Next, a configuration of the MFP 100 is described in detail below with reference to FIG. 3.

The document conveyance unit 250, which is provided in the reader unit 139, can successively feed document sheets from a document positioning plate and can convey each document sheet to an optical unit 213. The document conveyed to the optical unit 213 can be output to a discharge tray 219.

The reader unit 139 turns on a lamp 212 when a document sheet reaches a predetermined position above the optical unit 213. The optical unit 213 irradiates the document sheet with light. In this case, the light reflected from the document sheet can be guided to a CCD image sensor (hereinafter, referred to as "CCD") 218 via mirrors 214, 215, and 216 and a lens 217. The CCD 218 can read a document image. After predetermined processing is performed on image data output from the CCD 218, the processed image data can be transferred to the control apparatus 160.

Further, the reader unit 139 can read a document image when the document sheet is placed between the document conveyance unit 250 and a platen glass 211. In this case, the reader unit 139 turns on the lamp 212 and moves the optical unit 213. In this case, the light reflected from the document sheet can be guided to the CCD image sensor (hereinafter, simply referred to as "CCD") 218 via the mirrors 214, 215, and 216 and the lens 217. The CCD 218 can read a document image. After predetermined processing is performed on image data output from the CCD 218, the processed image data can be transferred to the control apparatus 160.

The printer unit 149 includes a laser driver 321 that drives a laser emitting unit 322. The laser driver 321 causes the laser emitting unit 322 to emit a laser beam based on image data output from the control apparatus 160. The laser emitting unit 322 irradiates a photosensitive drum 323 with the laser beam, so that a latent image corresponding to the laser beam can be formed on the photosensitive drum 323. A developing device 324 applies developer to a portion corresponding to the latent image formed on the photosensitive drum 323.

Further, the printer unit 149 includes a plurality of drawer-type cassettes 311 to 314 and the manual feeding tray 151, which can serve as a feeding unit 310. Each of the cassettes 311 to 314 and the manual feeding tray 151 can hold a plurality of sheets. When a sheet is fed from any one of the cassettes 311 to 314 or the manual feeding tray 151, the printer unit 149 conveys the sheet to a transfer unit 325 via a conveyance path 331. The transfer unit 325 transfers the developer from the photosensitive drum 323 to the sheet.

A conveyance belt 326 conveys the sheet, on which the developer has been transferred, to a fixing unit 327. The fixing unit 327 fixes the developer applied on the sheet with heat and pressure applied thereon. Subsequently, the sheet having passed through the fixing unit 327 is then discharged via a conveyance path 335 and a conveyance path 334. When a sheet is discharged with a print surface reversed, the sheet is preliminarily guided to a conveyance path 338 via a conveyance path 336. Then, the sheet is conveyed in the opposite direction and can be conveyed via a conveyance path 337 and the conveyance path 334.

Further, when the print setting is two-sided print, a flapper 329 guides a sheet to a conveyance path 333 via the conveyance path 336 after the sheet passes through the fixing unit 327. Subsequently, the sheet is conveyed in the opposite direction. The flapper 329 guides the sheet to the conveyance path 338. Subsequently, the sheet is guided to a re-feeding conveyance path 332. After the sheet is guided to the re-feeding conveyance path 332, the sheet is conveyed to the transfer unit 325 via the conveyance path 331 at the above-mentioned timing. The transfer unit 325 transfers the developer to a second surface of the sheet. Then, the sheet is guided to the conveyance path 334 via the fixing unit 327.

Regardless of the content (i.e., one-sided print or two-sided print) of the print setting, the sheet conveyed via the conveyance path 334 can be conveyed to a finisher unit.

The conveyed sheet is first sent to a buffer unit 501 of the finisher unit. The buffer unit 501 is configured to perform a buffering operation. To this end, the buffer unit 501 includes a buffer roller that can roll the conveyed sheet momentarily. For example, if it takes a significant time for a staple unit 506 positioned on a downstream side to perform staple processing, providing the above-mentioned buffer unit 501 is effective to adjust the conveyance interval between sheets successively conveyed from the main body of the MFP 100.

Then, the sheets are stacked on a stack tray 505 via a conveyance path 504 by an upstream discharge roller pair 502 and a downstream discharge roller pair 503. After a sheet bundle (i.e., a set of sheets) is stacked on the stack tray 505, the stacked sheet bundle can be output to a sheet discharge tray 507.

If the print setting includes the designation of shift, an appropriate gap is provided between the sheet bundle stacked on the stack tray 505 and the previously output sheet bundle, so that a user can easily recognize a break point between sheet bundles successively output to the discharge tray 507.

If the print setting includes the designation of staple processing, the staple unit 506 performs staple processing on a sheet bundle stacked on the stack tray 505 when the sheet bundle is conveyed by the upstream discharge roller pair 502 and the downstream discharge roller pair 503 via the conveyance path 504. The downstream discharge roller pair 503 outputs the stapled sheet bundle to the discharge tray 507.

The printing system according to the present exemplary embodiment is described in detail below based on a monochrome machine that includes only one developing device (i.e., the developing device 324) and only one photosensitive drum (i.e., the photosensitive drum 323). However, the present invention can be applied to a color machine that includes four photosensitive drums dedicated to cyan, yellow, magenta, and black developing devices, respectively. Further, in the present exemplary embodiment, the printing apparatus employed to print an image on a sheet is an electrophotographic type, as described in detail below. However, the electrophotographic printing apparatus can be replaced by an inkjet printing apparatus. Further, thermal transfer printing or any other printing technique is employable.

Figure 4:
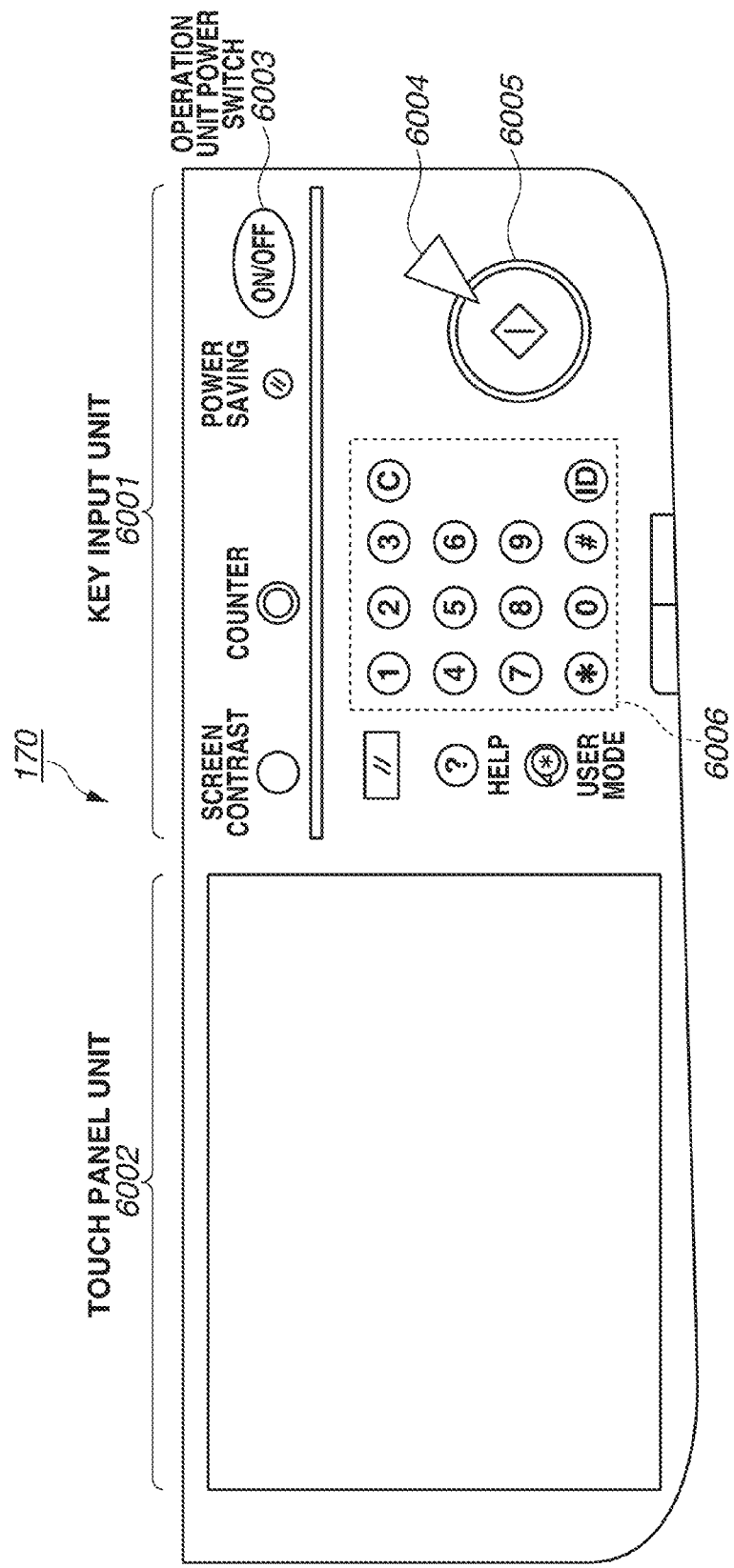
FIG. 4 illustrates an operation unit according to the present exemplary embodiment.

Next, the operation unit 170 of the MFP 100 illustrated in FIG. 1 is described in detail below with reference to FIG. 4.

The operation unit 170 includes a key input unit 6001 that can accept a user instruction input via one or a plurality of hard keys provided thereon and a touch panel unit 6002 that can accept a user instruction input via one or a plurality of soft keys displayed thereon. As described above, the operation unit 170 according to the present exemplary embodiment includes both the hard keys and the soft keys. However, the operation unit 170 can be constituted to have soft keys only.

First, the key input unit 6001 is described in detail below. As illustrated in FIG. 4, the key input unit 6001 includes an operation unit power switch 6003. If the operation unit power switch 6003 is pressed by a user when the MFP 100 is in a standby mode (i.e., an ordinary operation state), the CPU 201 switches the operation mode of the MFP 100 from the standby mode to a sleep mode (i.e., a power consumption saving state). On the other hand, if the operation unit power switch 6003 is pressed by a user when the MFP 100 is in the sleep mode, the CPU 201 switches the operation mode of the MFP 100 from the sleep mode to the standby mode.

A start key 6005 is an operational key that enables a user to instruct the MFP 100 to start copy processing or data transmission processing.

A stop key 6004 is an operational key that enables a user to instruct the MFP 100 to stop the copy processing or the data transmission processing.

A numeric keypad 6006 is an operational key that enables a user to perform various settings.

Next, the touch panel unit 6002 is described in detail below. The touch panel unit 6002 includes a liquid crystal display (LCD) unit and a touch panel sheet including transparent electrodes adhered to the surface of the LCD unit. The touch panel unit 6002 is functionally operable to accept various settings from a user and is also functionally operable to present information to a user.

The MFP 100 having the above-mentioned configuration can execute a plurality of jobs that are different in type.

For example, the MFP 100 can execute a copy job. More specifically, the MFP 100 causes the reader unit 139 to read an image of a document and generates image data representing the document image. Then, the MFP 100 prints an image on a sheet based on the generated image data and settings accepted via the operation unit 170.

Further, the MFP 100 can execute a print job. More specifically, the MFP 100 analyzes print data received from the PC 111 and generates image data based on printing settings accepted from the PC 111. Then, the MFP 100 prints an image on a sheet based on the generated image data.

Further, the MFP 100 can execute a facsimile print job. More specifically, the MFP 100 receives code data from an external facsimile apparatus via a telephone line and converts the received code data into image data. Then, the MFP 100 prints an image on a sheet based on the converted image data.

As described above, the MFP 100 according to the present exemplary embodiment can execute various types of jobs. However, the present invention is not limited to the above-mentioned example. The MFP 100 can be configured to execute a part of the above-mentioned types of jobs.

Further, the MFP 100 can print an image on an envelope. For example, a user places an envelope on the manual feeding tray 151 and performs envelope settings via the operation unit 170. Then, the user operates the MFP 100 to execute a copy job or a print job to print an image on an envelope.

There is a plurality of ways in placing an envelope on the manual feeding tray 151. The placement of an envelope to be placed on the manual feeding tray 151 is described in detail below with reference to FIGS. 5A and 5B.

Figure 5A:
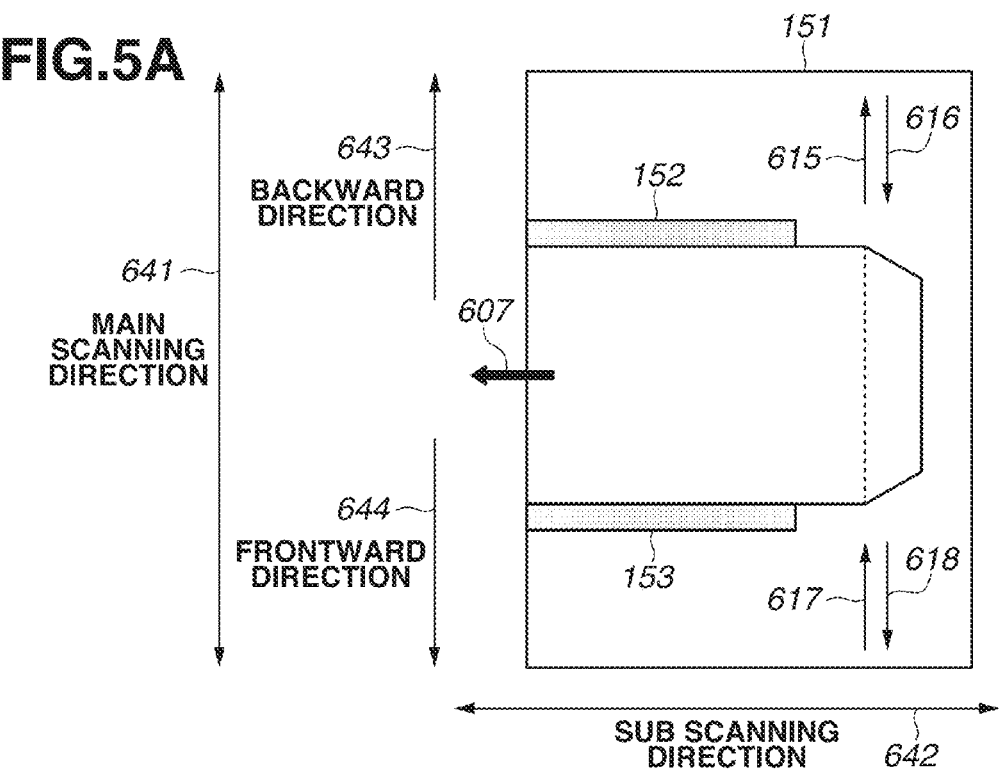
FIGS. 5A and 5B illustrate a manual feeding tray according to the present exemplary embodiment.
Figure 5B:
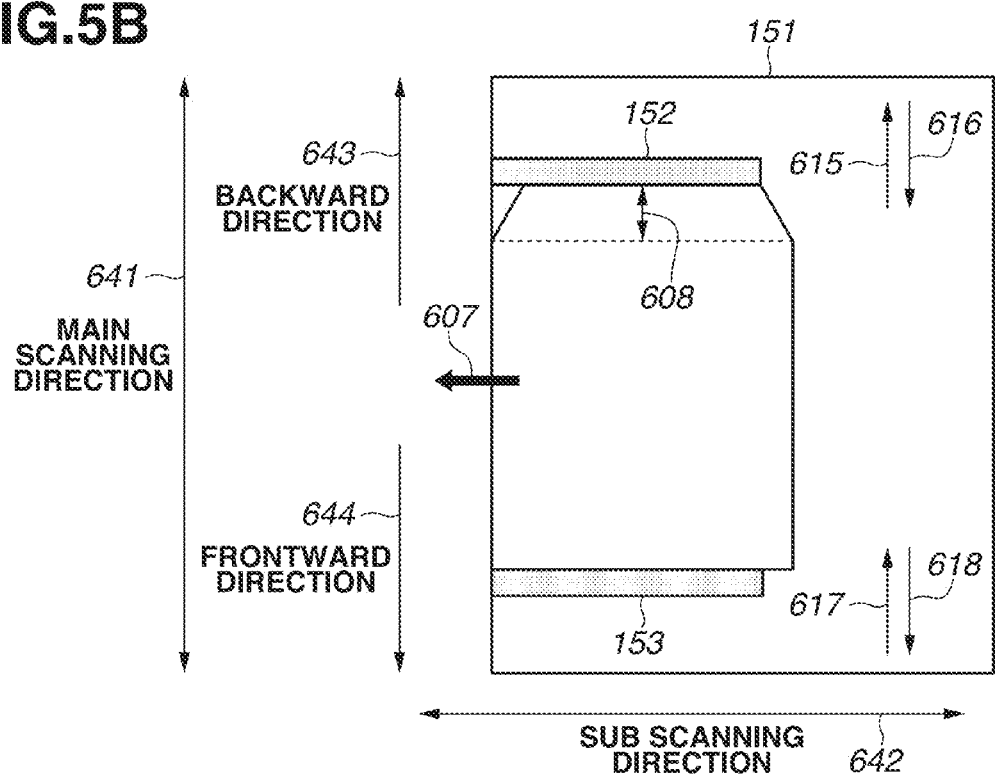

FIGS. 5A and 5B are plan views illustrating the manual feeding tray 151. A conveyance direction 607 indicates the direction along which a sheet placed on the manual feeding tray 151 can be fed by the printer unit 149 of the MFP 100 when the MFP 100 performs printing. A direction 641 indicates a main scanning direction. A direction 642 indicates a sub scanning direction. Further, in the present exemplary embodiment, a backward direction 643 indicates the back side and a frontward direction 644 indicates the front side when a user stands in front of the MFP 100 (i.e., on the front side of the MFP 100 illustrated in FIG. 3).

According to an example illustrated in FIG. 5A, an envelope is in a state where the flap thereof is opened and is placed on the manual feeding tray 151 in such a manner that a short side of the envelope is positioned at the leading end in the envelope conveyance direction.

On the other hand, according to an example illustrated in FIG. 5B, an envelope is in a state where the flap thereof is opened and is placed on the manual feeding tray 151 in such a manner that a long side of the envelope is positioned at the leading end in the envelope conveyance direction.

A user moves the guide 152 of the manual feeding tray 151 in a backward direction 615 or a frontward direction 616 until the position of the guide 152 coincides with the upper end of the envelope placed on the manual feeding tray 151. In this case, the guide 153 moves oppositely in response to the movement of the guide 152. More specifically, if the guide 152 moves a predetermined distance in the frontward direction 616, the guide 153 moves the same distance in a backward direction 617.

If the guide 152 moves a predetermined distance in the backward direction 615, the guide 153 moves the same distance in a frontward direction 618. The clearance (i.e., the distance) between two guides 152 and 153 can be detected by the sensor 150 described with reference to FIG. 1. More specifically, the sensor 150 can detect the length of the sheet in the main scanning direction 641 when the user moves the guide 152 and the guide 153 until the guides 152 and 153 contact the edge portions of the sheet having been placed on the manual feeding tray 151. The length detected by the sensor 150 can be transmitted to the CPU 201. The CPU 201 detects the length of the sheet having been placed on the manual feeding tray 151 in the main scanning direction 641.

Further, the guide 152 and the guide 153 have a role to suppress a skew movement of the sheet when the sheet is fed from the manual feeding tray 151.

A control that can be performed by the CPU 201 when an envelope or another sheet is placed on the manual feeding tray 151 is described in detail below with reference to flowcharts illustrated in FIGS. 6 and 7 and screen transition diagrams illustrated in FIGS. 8A to 8F and FIG. 9.

Figure 8A:
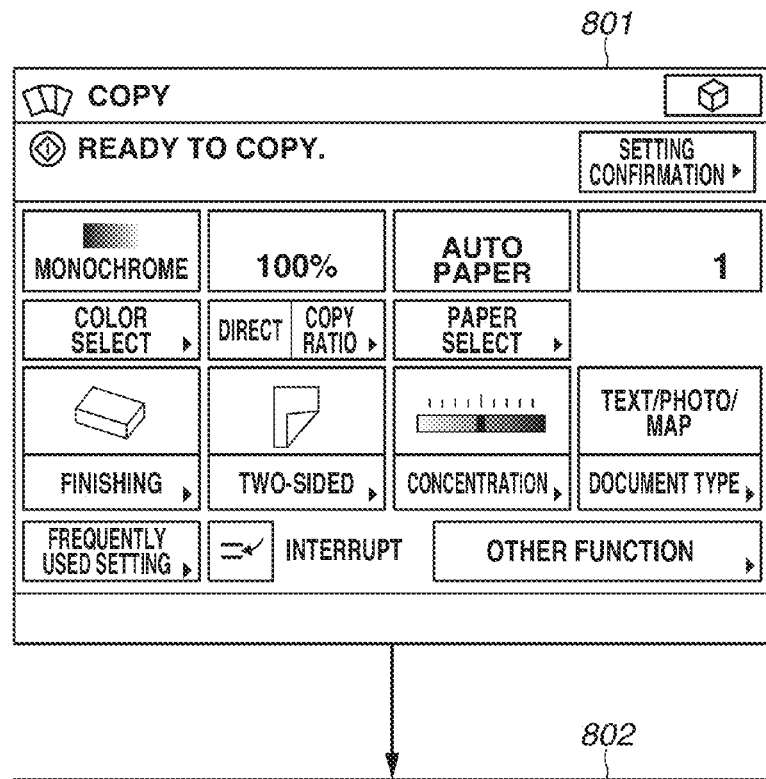

The CPU 201 starts the processing of the flowchart illustrated in FIG. 6 when the sensor 155 illustrated in FIG. 1 detects a sheet placed on the manual feeding tray 151 in a state where a copy initialization screen illustrated in FIG. 8A is displayed. To realize each processing of the flowchart illustrated in FIG. 6, the CPU 201 executes a program stored in the ROM 203.

Figure 8B:
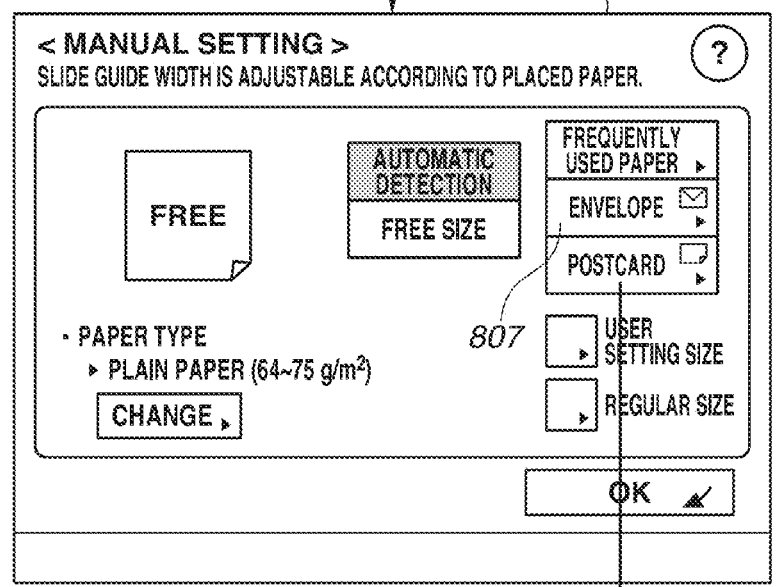
Figure 8E:
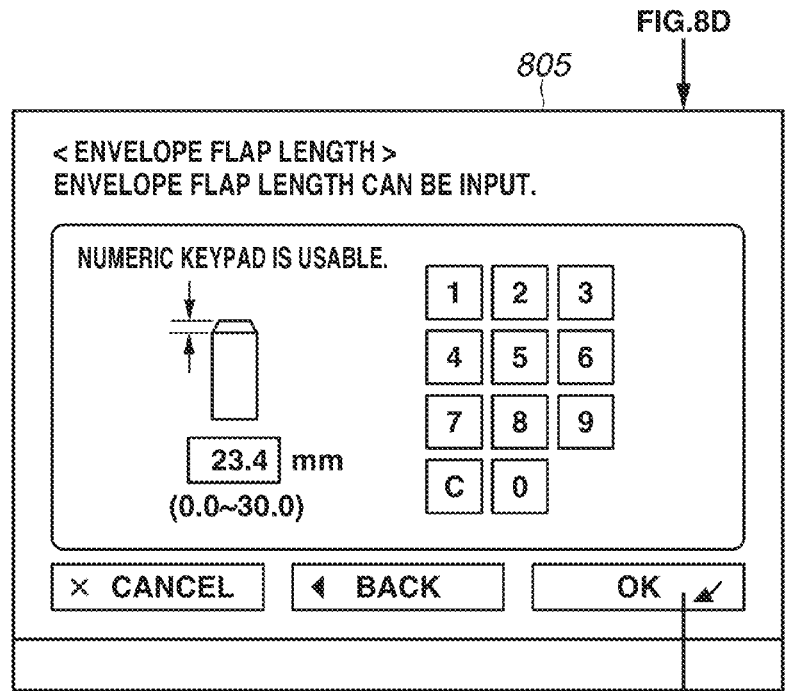
Figure 8F:
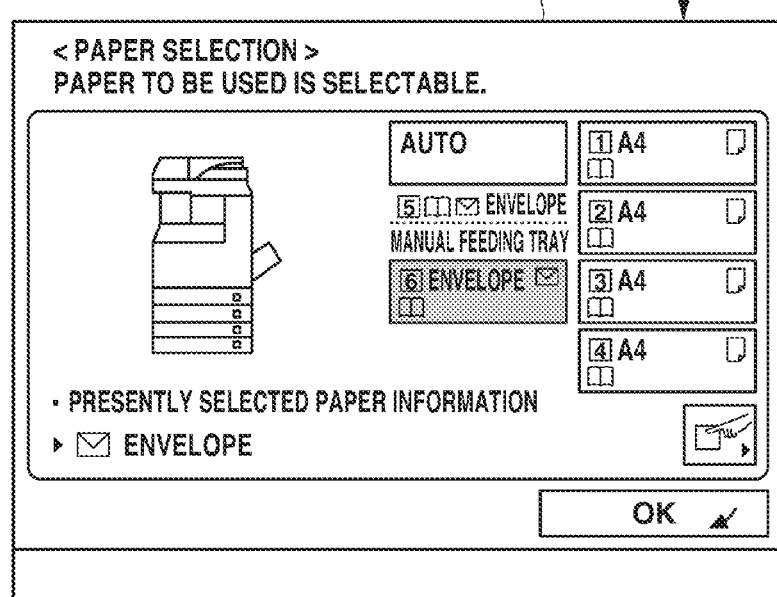

In step S5001 in FIG. 6, the CPU 201 switches the display of the operation unit 170 from the copy initialization screen illustrated in FIG. 8A to a sheet setting screen illustrated in FIG. 8B.

In step S5002, the CPU 201 determines whether an envelope button 807 has been pressed. If it is determined that the envelope button 807 has been pressed (YES in step S5002), the operation proceeds to step S5003. If it is determined that the envelope button 807 has not been pressed (NO in step S5002), the operation proceeds to step S5009. For example, if a regular size button is pressed, then in step S5009, the CPU 201 causes the operation unit 170 to display a screen that enables a user to select a desired regular size (e.g., A4 size, B5 size, or A5 size) and accepts information about the regular size selected by the user.

Then, the CPU 201 stores the accepted size, as size information about the sheet placed on the manual feeding tray 151, in the HDD 204 and terminates processing illustrated in FIG. 6. The size information stored in the HDD 204 can be later referred to in determining a print range of an image to be printed and a variable magnification of the image when the printer unit 149 performs image print processing.

On the other hand, if the pressing of the envelope button 807 has been confirmed (YES in step S5002), the operation proceeds to step S5003. The CPU 201 causes the operation unit 170 to display an envelope setting screen illustrated in FIG. 8C. The screen illustrated in FIG. 8C enables a user to select an intended envelope size, such as Nagagata #3 or No. 10 envelope. Each rectangular envelope has a size defined according to the regulation. For example, the Nagagata #3 envelope has a short side of 120 mm and a long side of 235 mm. The No. 10 envelope has a short side of 104.7 mm and a long side of 241.3 mm. The size information defining respective envelopes is stored beforehand in the ROM 203 so that the stored values can be appropriately referred to by CPU 201.

FIGS. 5A and 5B illustrate two examples with respect to the placement of an envelope placed on the manual feeding tray 151. The placement illustrated in FIG. 5A is generally referred to as "landscape orientation" according to which the flap of an envelope is directed toward the rear end side in the conveyance direction. The placement illustrated in FIG. 5B is generally referred to as "portrait orientation" according to which the long side of an envelope is perpendicular to the guide 152.

When the envelope placement direction is the landscape orientation, the user selects a desired envelope size on the screen illustrated in FIG. 8C. On the other hand, when the envelope placement direction is the portrait orientation, the user presses a portrait orientation shift button 808 illustrated in FIG. 8C to cause the operation unit 170 to display a screen illustrated in FIG. 8D that enable the user to select a desired envelope size. The CPU 201 controls the operation unit 170 in such a manner that a Kakugata #2 selection key is not displayed on the screen illustrated in FIG. 8D although the Kakugata #2 selection key can be displayed on the screen illustrated in FIG. 8C.

The above-mentioned control intends to prevent the length of the Kakugata #2 envelope in the main scanning direction from exceeding the printable range of the MFP 100 in the main scanning direction when the Kakugata #2 envelope size is 330 mm×240 mm and the placement of the Kakugata #2 envelope is the portrait orientation. Therefore, the portrait orientation screen does not display the Kakugata #2 selection key because the size of the Kakugata #2 envelope cannot be portrait oriented. This is effective to prevent the CPU 201 from performing the operation when the user selection is erroneous.

If a desired envelope size is selected on the screen illustrated in FIG. 8C and the OK key is pressed, the CPU 201 starts the processing in step S5004. In step S5004, the CPU 201 stores the selected envelope size (e.g., Nagagata #3 or No. 10 envelope) and information about the landscape oriented envelope, as placement information about the sheet placed on the manual feeding tray 151, in the HDD 204. On the other hand, if the Next key is pressed after the envelope size is selected on the screen illustrated in FIG. 8D, then in step S5004, the CPU 201 stores the selected envelope size and information indicating that the envelope placement direction is the portrait orientation, as placement information about the sheet placed on the manual feeding tray 151, in the HDD 204.

Then, in step S5005, the CPU 201 determines whether the envelope placement presently stored is the portrait orientation. If it is determined that the envelope placement presently stored is the portrait orientation (YES in step S5005), then in step S5006, the CPU 201 causes the operation unit 170 to display a screen illustrated in FIG. 8E. Further, the CPU 201 accepts information about an envelope flap size (length) from the user and stores the acquired information in the HDD 204. If it is determined that the envelope placement presently stored is the landscape orientation (NO in step S5005), the operation proceeds to step S5007 without causing the operation unit 170 to display the screen illustrated in FIG. 8E.

The following is the reason why the CPU 201 permits the user to input the envelope flap size only when the presently stored envelope placement direction is the portrait orientation as mentioned above. When the envelope placement direction is the portrait orientation, the envelope placed on the manual feeding tray 151 is in a state illustrated in FIG. 5B. If the print processing is started in the above-mentioned state without shifting the flap of the envelope by a length 608, an image may be erroneously printed on the flap. Therefore, only when the envelope placement direction is the portrait orientation, the CPU 201 permits the user to input the flap size to determine an image shift length.

On the other hand, when the envelope placement direction is the landscape orientation, it is unnecessary to shift an image to be printed on the envelope. Therefore, it is feasible to omit the step of inputting the envelope flap size, to reduce time and effort for the user operation.

Next, in step S5007, the CPU 201 performs guide error determination processing. The guide error determination processing is described in detail below with reference to FIG. 7.

Figure 7:
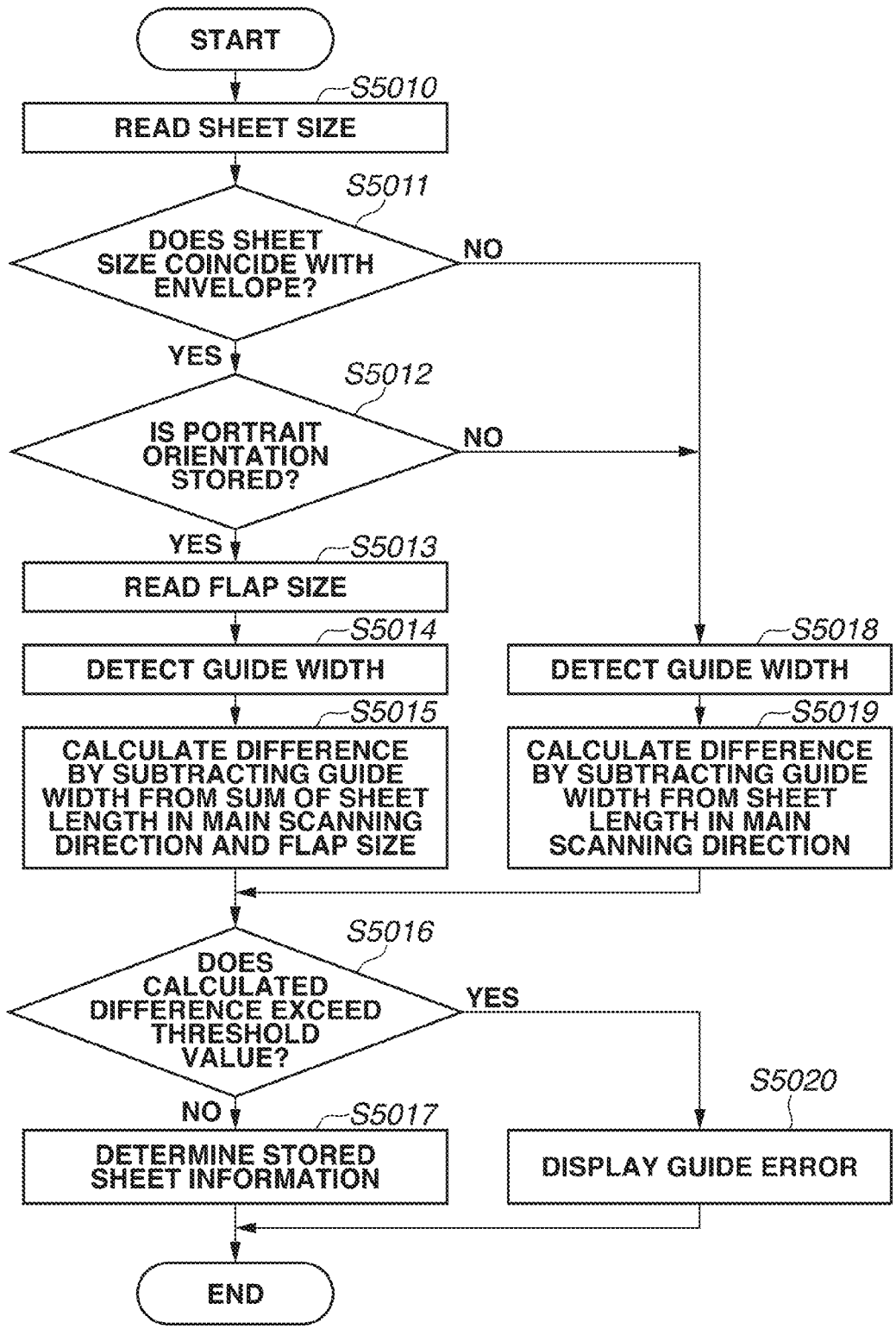
FIG. 7 is a flowchart illustrating guide error determination processing according to the first exemplary embodiment.

To realize each processing of the flowchart illustrated in FIG. 7, the CPU 201 executes a program stored in the ROM 203.

First, in step S5010, the CPU 201 reads the size of a sheet having been placed on the manual feeding tray 151 from the HDD 204 and loads the readout sheet size information into the RAM 202.

In step S5011, the CPU 201 determines whether the sheet size having been set on the sheet setting screen illustrated in FIG. 8B coincides with an envelope, based on the sheet size information loaded in the RAM 202. If the CPU 201 determines that the presently set sheet size coincides with an envelope (YES in step S5011), the operation proceeds to step S5012. If the CPU 201 determines that the presently set sheet size does not coincide with any envelope (NO in step S5011), the operation proceeds to step S5018.

In step S5012, the CPU 201 determines whether the presently stored envelope placement direction is the portrait orientation. If it is determined that the presently stored envelope placement direction is the portrait orientation (YES in step S5012), the operation proceeds to step S5013. If it is determined that the presently stored envelope placement direction is not the portrait orientation, more specifically, when the presently stored envelope placement direction is the landscape orientation (NO in step S5012), the operation proceeds to step S5018.

In step S5013, the CPU 201 reads the flap size from the HDD 204 and loads the readout flap size into the RAM 202.

In step S5014, the CPU 201 detects a guide width representing the clearance between the guide 152 and the guide 153 based on a signal of the sensor 150 that can detect the actual clearance between the guide 152 and the guide 153.

In step S5015, the CPU 201 determines the length of the envelope in the main scanning direction based on the envelope size loaded in the RAM 202. For example, the size stored in the ROM 203 for the Nagagata #3 envelope is 120 mm in the short side and 235 mm in the long side. The CPU 201 determines the length of the envelope having been portrait oriented in the main scanning direction is 235 mm. Then, the CPU 201 calculates a difference value by subtracting the guide width (i.e., the clearance between the guide 152 and the guide 153) detected in step S5014 from a sum of the determined length of the envelope in the main scanning direction and the flap length having been read in step S5013.

In step S5016, the CPU 201 determines whether an absolute value of the difference calculated in step S5015 exceeds a predetermined threshold value (e.g., 10 mm). The threshold value (e.g., 10 mm) is equivalent to an allowable gap between the sheet placed on the manual feeding tray 151 and the guide 152 or the guide 153. The threshold value can be stored beforehand in the ROM 203 at the time of factory shipment of the MFP 100 or can be stored in the HDD 204 so that a user can arbitrarily change the threshold value via the operation unit 170 or the PC 111.

If it is determined that the absolute value of the difference exceeds the predetermined threshold value (YES in step S5016), the operation proceeds to step S5020. If it is determined that the absolute value of the difference does not exceed the predetermined threshold value (NO in step S5016), the operation proceeds to step S5017.

In step S5017, the CPU 201 determines the sheet size information stored in the HDD 204, together with sheet information (e.g., sheet placement direction and flap size) if the sheet size coincides with an envelope, as information about the sheet placed on the manual feeding tray 151. Then, the CPU 201 terminates the processing of the flowchart illustrated in FIG. 7.

Figure 9:
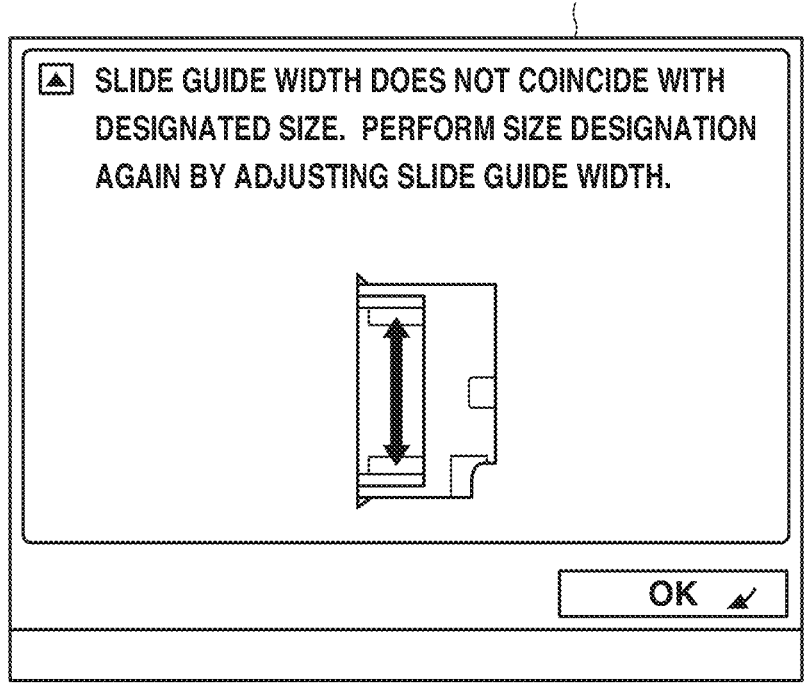
FIG. 9 illustrates an operation screen according to the first exemplary embodiment.

On the other hand, when the operation proceeds to step S5020, the CPU 201 causes the operation unit 170 to display a guide error screen illustrated in FIG. 9 and terminates the processing of the flowchart illustrated in FIG. 7. The guide error screen illustrated in FIG. 9 includes a message that informs inconsistency between the guide width and the designated size and encourages a user to adjust the guide width. The error message to be displayed on the guide error screen is not limited to the above-mentioned example. For example, a message that encourages the user to change arrangement of the sheet is usable as the error message.

If the CPU 201 accepts a print instruction from the user via the start key 6005 of the operation unit 170 after the information about sheet having been placed on the manual feeding tray 151 has been determined in step S5017 illustrated in FIG. 7, the CPU 201 causes the MFP 100 to start copy processing based on the determined sheet information.

More specifically, the CPU 201 causes the reader unit 139 to read an image of a document. The CPU 201 determines a print range of the read document image based on the determined sheet size and controls the MFP 100 to print an image on a sheet.

Further, when the sheet size coincides with an envelope, the CPU 201 determines whether to rotate the image based on the determined sheet placement direction. More specifically, when the envelope placement direction is the portrait orientation, the CPU 201 causes the MFP 100 to perform printing on the envelope without rotating the document image. When the envelope placement direction is the landscape orientation, the CPU 201 causes the MFP 100 to perform printing on the envelope after rotating the image 90 degrees in the clockwise direction. Further, when the sheet size coincides with an envelope and the envelope placement direction is the portrait orientation, the CPU 201 causes the MFP 100 to perform printing after shifting the image by an amount corresponding to the flap size in the frontward direction illustrated in FIG. 5B.

The print processing is performed not only based on the sheet information determined in step S5017 but also based on the settings (e.g., number of print copies and print layout) accepted via the operation unit 170.

On the other hand, if the CPU 201 accepts a print instruction via the start key 6005 of the operation unit 170 in a state where the information about the sheet placed on the manual feeding tray 151 is not determined after the error message is displayed in step S5020, the CPU 201 does not start the copy processing.

According to the above-mentioned exemplary embodiment, the CPU 201 can determine whether to display the guide error screen considering the envelope flap size even when the envelope placement direction is the portrait orientation. Accordingly, the printing system according to the present exemplary embodiment can prevent a user from being confused by the display of the guide error screen even when the envelope is accurately positioned.

According to the above-mentioned exemplary embodiment, the MFP 100 displays all printable envelope sizes after an envelope is placed on the manual feeding tray 151 and a user designates the size of the envelope placed on the manual feeding tray 151.

An MFP 100 according to a second exemplary embodiment does not require a user to designate an envelope size because the MFP 100 can read envelope size information registered beforehand when the envelope is placed on the manual feeding tray 151. To this end, the MFP 100 registers the size of each envelope to be placed on the manual feeding tray beforehand and uses the readout envelope size. Further, the MFP 100 according to the second exemplary embodiment displays a guide error considering the envelope size when the MFP 100 reads and uses the envelope size information registered beforehand, as described in detail below.

The MFP 100 according to the second exemplary embodiment has a configuration similar to that described in the first exemplary embodiment and therefore redundant description thereof will be avoided.

FIG. 10A illustrates a screen that can be displayed on the operation unit 170 when a user mode key has been pressed on the operation unit 170.

If a "manual feeding paper default setting" key 1812 is pressed on the screen 1801, a screen 1802 illustrated in FIG. 10B can be displayed on the operation unit 170.

FIG. 10B illustrates a screen that enables a user to register a method for designating a sheet size of a sheet to be placed on the manual feeding tray 151 beforehand. The sheet size designation method according to the present exemplary embodiment includes the following three designation methods.

(1) Fixed mode
(2) Occasional designation mode (standard)
(3) Occasional designation mode (frequently used paper)

In the first mode (1), i.e., the fixed mode, the MFP 100 reads fixed information about the sheet size and the type registered beforehand by a user when a sheet is placed on the manual feeding tray 151 and set the readout information as size/type information about the sheet placed on the manual feeding tray 151.

In the second mode (2) or in the third mode (3), namely in the each time designation mode (standard) or the each time designation mode (frequently used paper), the MFP 100 displays a sheet size/type setting screen on the operation unit 170 each time a sheet is placed on the manual feeding tray 151.

In the second mode (2), i.e., the each time designation mode (standard), the MFP 100 displays a size/type list of all sheets that can be printed by the MFP 100 when a sheet is placed on the manual feeding tray 151 to enable a user to select a desired sheet size and a desired sheet type.

On the other hand, in the third mode (3), i.e., the each time designation mode (frequently used paper), the MFP 100 displays candidates of frequently used sheets registered beforehand, each time a sheet is placed on the manual feeding tray 151 to enable a user to select desired sheet size/type from the displayed candidates, as the size and type of a sheet placed on the manual feeding tray 151.

A user can register any one of the above-mentioned first to third modes (1) to (3) beforehand as an operation mode to be selected by the MFP 100 when a sheet is placed on the manual feeding tray 151.

More specifically, if the OK key is pressed in a state where the fixed mode is selected on the screen as illustrated in FIG. 10B, the CPU 201 registers the fixed mode in the HDD 204.

Figure 10C:
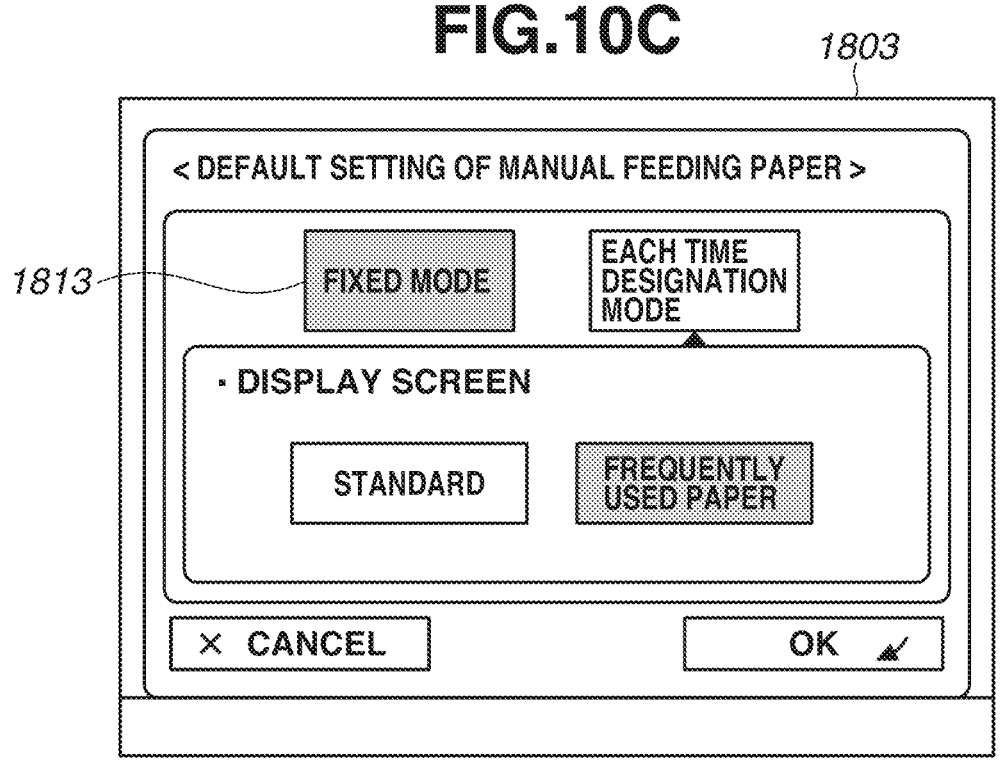

Further, if the each time designation mode key illustrated in FIG. 10B is pressed, a screen illustrated in FIG. 10C can be displayed. The screen illustrated in FIG. 10C enables a user to designate either the each time designation mode (standard) or the each time designation mode (frequently used paper).

Figure 10D:
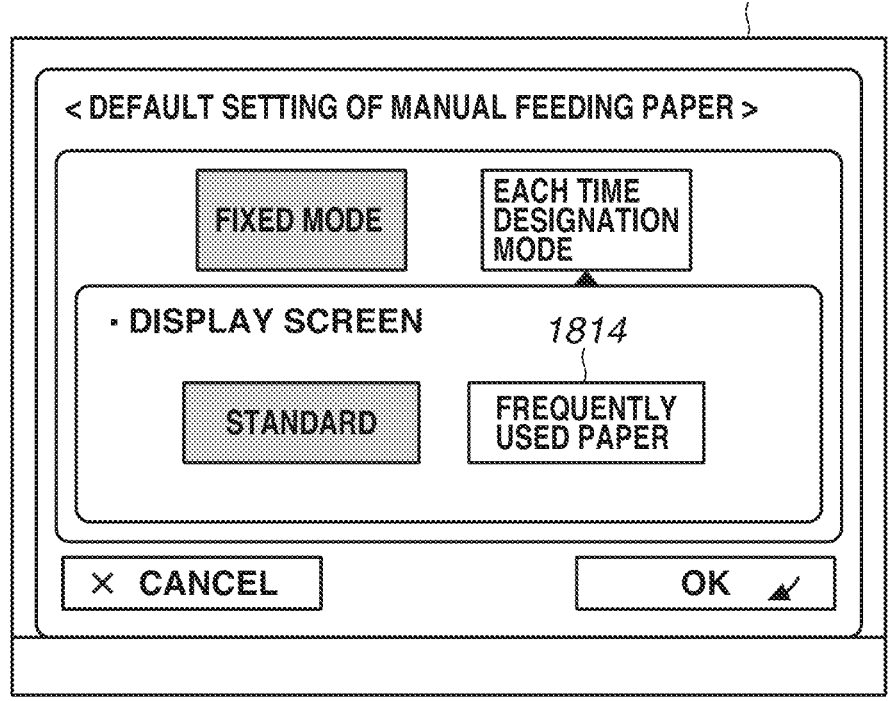

If an OK key is pressed in a state where a standard key illustrated in FIG. 10C is selected, the CPU 201 registers the each time designation mode (standard) in the HDD 204. Further, as illustrated in FIG. 10D, if an OK key is pressed in a state where a frequently used paper key is selected, the CPU 201 registers the each time designation mode (frequently used paper) in the HDD 204.

In using the first mode (1) and the third mode (3), namely in using the fixed mode and the each time designation mode (frequently used paper), it is necessary to register sheet information to be used when a sheet is placed on the manual feeding tray 151 beforehand.

A paper registration method for the first mode (1) and the third mode (3), namely for the fixed mode and the each time designation mode (frequently used paper), is described in detail below.

First, a sheet information registration method in the fixed mode (1) is described in detail below with reference to FIGS. 11A to 11H.

Figure 11A:
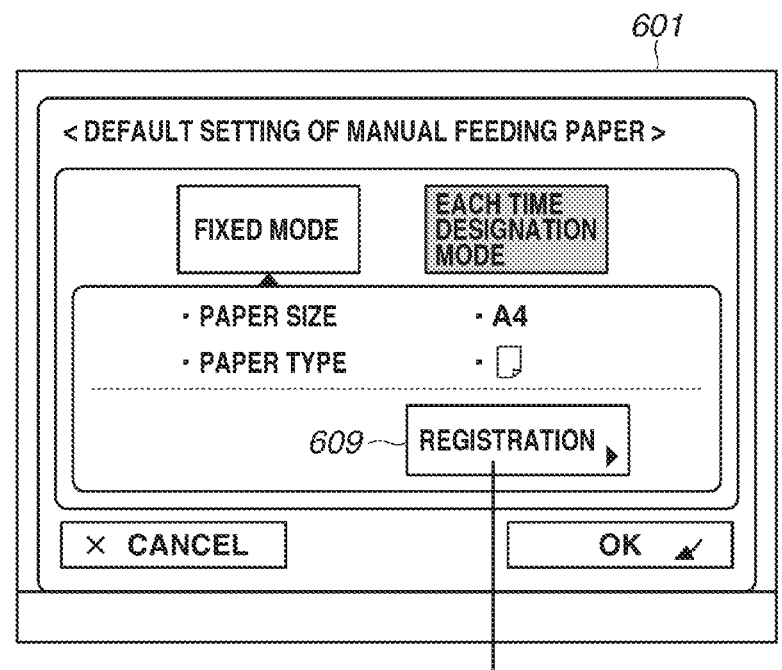

A screen illustrated in FIG. 11A is similar to the screen illustrated in FIG. 10B.

The information displayed on the screen illustrated in FIG. 11A includes a sheet size (i.e., A4 size) and a sheet type (i.e., plain paper) that are presently registered.

Figure 11B:
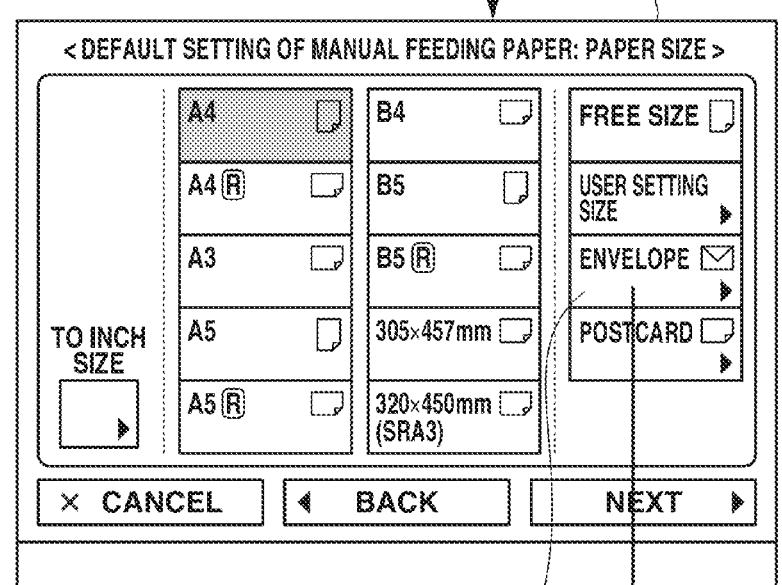

If a registration key 609 illustrated in FIG. 11A is pressed, a screen illustrated in FIG. 11B can be displayed on the operation unit 170. The screen illustrated in FIG. 11B includes regular paper size keys (e.g., A4 size, B5 size, and A5 size keys) and an envelope key 610. A user can select a size to be registered from the screen illustrated in FIG. 11B. For example, if the user wants to register a regular paper size, the user can press a desired regular paper size button and then press the Next button. The paper size (e.g., A4 size, B5 size, or A5 size) corresponding to the pressed regular paper size button can be registered in the HDD 204. On the other hand, if the user wants to register an envelope size, the user can press the envelope key 610.

Figure 11C:
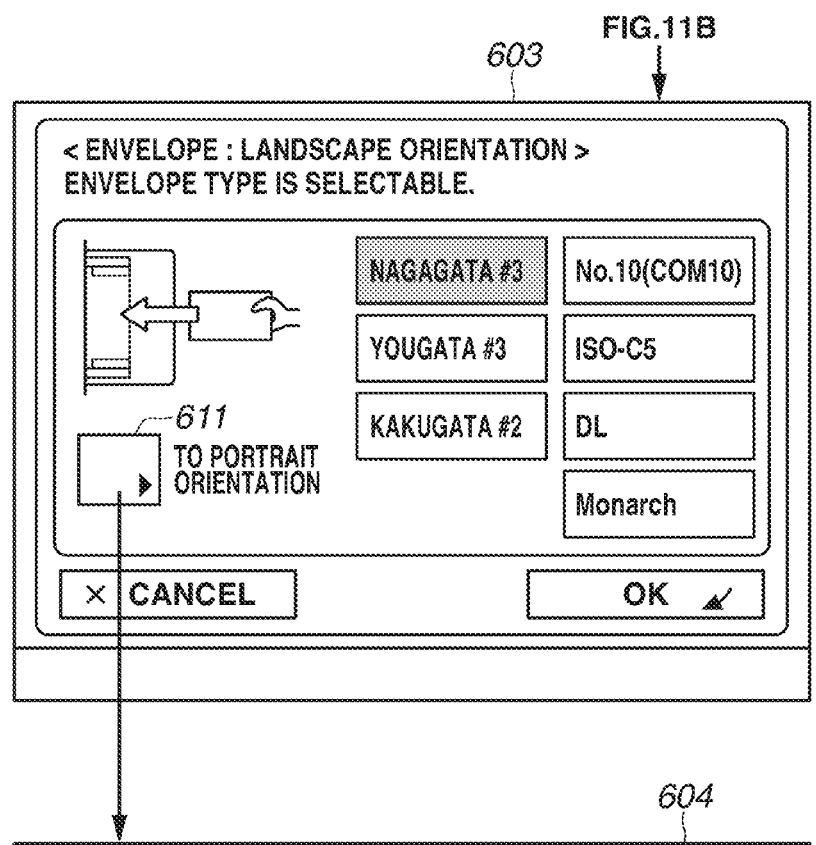

If the envelope key 610 is pressed, a screen illustrated in FIG. 11C can be displayed on the operation unit 170. The information displayed on the screen illustrated in FIG. 11C includes a list of various envelope sizes (including Nagagata #3 and No. 10). The screen illustrated in FIG. 11C is usable when the envelope is placed in such a way as to position the short side of the envelope on the leading side in the conveyance direction (namely, when the envelope placement direction is the landscape orientation). If the user selects an envelope size to be registered and presses the OK key, the CPU 201 stores the selected envelope size and information indicating that the envelope placement direction is the landscape orientation in the HDD 204 and causes the operation unit 170 to display a screen illustrated in FIG. 11F.

Figure 11D:
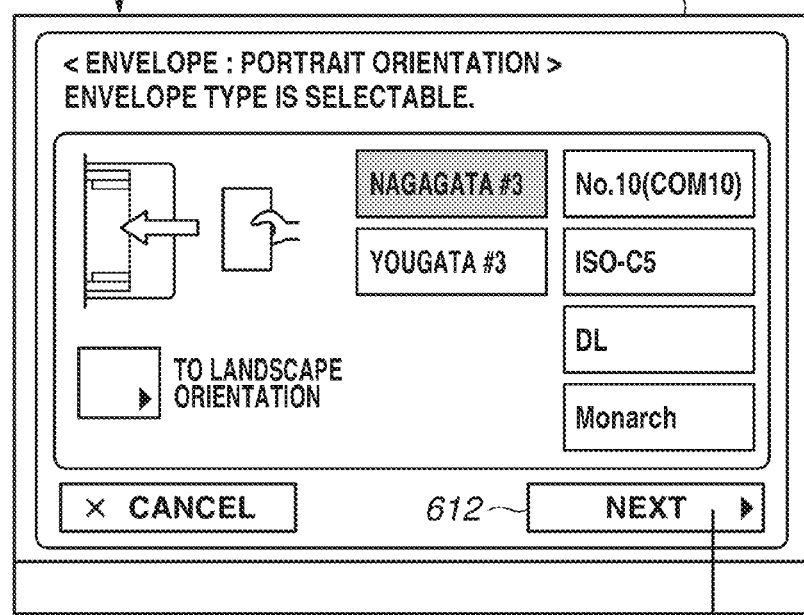

On the other hand, when a user wants to place an envelope in such a way as to position the long side of the envelope on the leading side in the conveyance direction (namely, when the envelope placement direction is the portrait orientation), the user presses a portrait orientation key 611 to cause the operation unit 170 to display a screen illustrated in FIG. 11D.

The information displayed on the screen illustrated in FIG. 11D includes a list of various envelope sizes including Nagagata #3 and No. 10. The screen illustrated in FIG. 11D is usable when the envelope is placed in such a way as to position the long side of the envelope on the leading side in the conveyance direction (namely, when the envelope placement direction is the portrait orientation).

If the user selects an envelope size to be registered and presses the Next key, the CPU 201 stores the selected envelope size and information indicating that the envelope placement direction is the portrait orientation in the HDD 204 and causes the operation unit 170 to display a screen illustrated in FIG. 11E.

The screen illustrated in FIG. 11E enables a user to input an envelope flap size. The information displayed on the screen illustrated in FIG. 11E includes a presently set flap size (12.3 mm), an acceptable flap size range, and a numeric keypad that is operable to input a flap size. The user can input a desired flap size by operating the displayed numeric keypad or the hard numeric keypad 6006 of the key input unit 6001. If the envelope flap is in a closed state, the user can input 0 mm as the flap size. If an OK key 613 is pressed, the CPU 201 stores the input flap size in the HDD 204 and causes the operation unit 170 to display the screen illustrated in FIG. 11E.

Figure 11G:
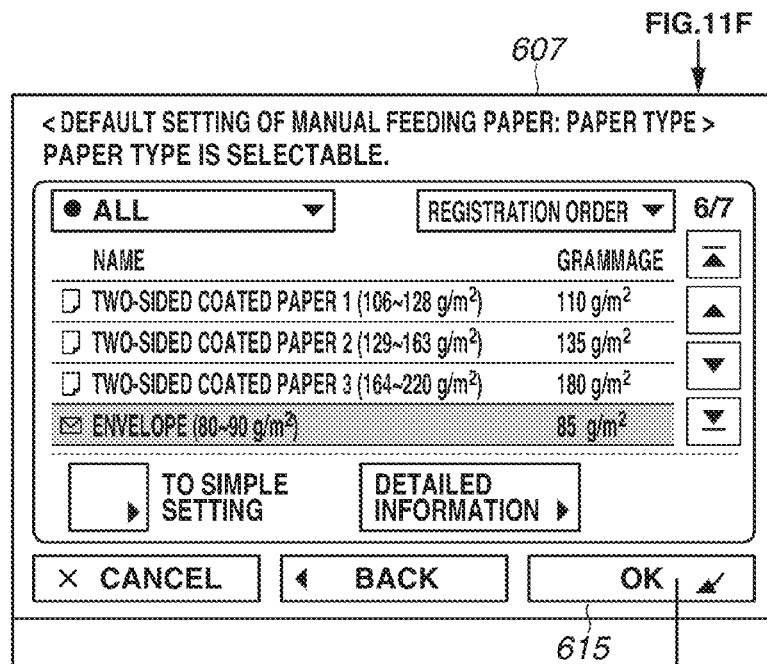

If a Next key 614 is pressed on the screen illustrated in FIG. 11F, a screen illustrated in FIG. 11G can be displayed on the operation unit 170. The screen illustrated in FIG. 11G enables a user to input a type of the sheet having been placed on the manual feeding tray 151. There is a plurality of types of envelopes that are similar in size and are differentiated in grammage. Therefore, it is necessary to change the temperature of the fixing unit 327 or the conveyance speed of the envelope according to the grammage.

Accordingly, the information displayed on the screen illustrated in FIG. 11G includes a list of sheet types in association with individual grammage values to enable the user to select a desired sheet type. If an OK key 615 is pressed after the sheet type has been selected on the screen illustrated in FIG. 11G, the CPU 201 stores the selected sheet type information in the HDD 204 and causes the operation unit 170 to display a screen illustrated in FIG. 11H.

Figure 11H:
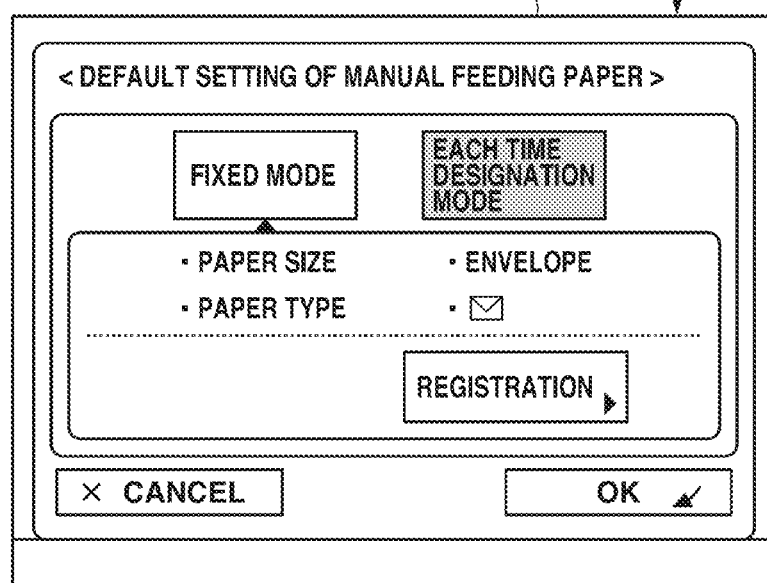

The information displayed on the screen illustrated in FIG. 11H indicates that the registered paper size is the envelope size and the registered paper type is the envelope.

The MFP 100 can read and use the sheet information having been set as mentioned above when a sheet is placed on the manual feeding tray 151.

Therefore, each time a user sets a sheet on the manual feeding tray 151, the MFP 100 can print an image on the sheet placed on the manual feeding tray 151 according to setting contents without requiring any input of sheet information.

Next, a sheet information registration method in the each time designation mode (frequently used paper) (3) is described in detail below with reference to FIGS. 12A to 12H.

Figure 12A:
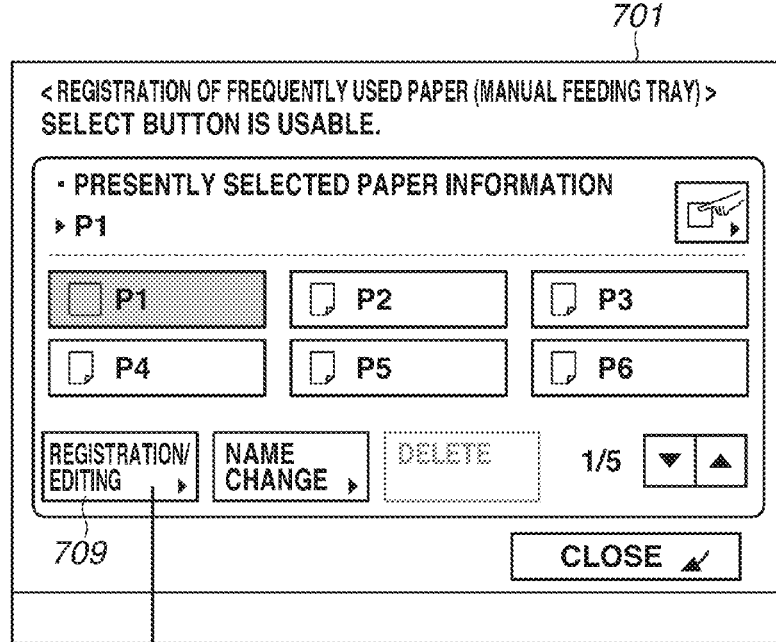

FIG. 12A illustrates a screen that can be displayed on the operation unit 170 when a frequently used paper registration key 509 illustrated in FIG. 10A is pressed.

The information displayed on the screen illustrated in FIG. 12A includes P1 to P6 keys so that sheet information (e.g., frequently used sheet size and type) can be registered in association with respective keys. The total number of keys is not limited to six and can be any other number when a plurality of pieces of sheet information can be registered.

The screen illustrated in FIG. 12A includes a registration/editing key 709 that can be pressed by a user to register sheet size/type information after the user selects any one of the P1 to P6 keys. According to the example illustrated in FIG. 12A, the selected key is the P1 key.

Figure 12B:
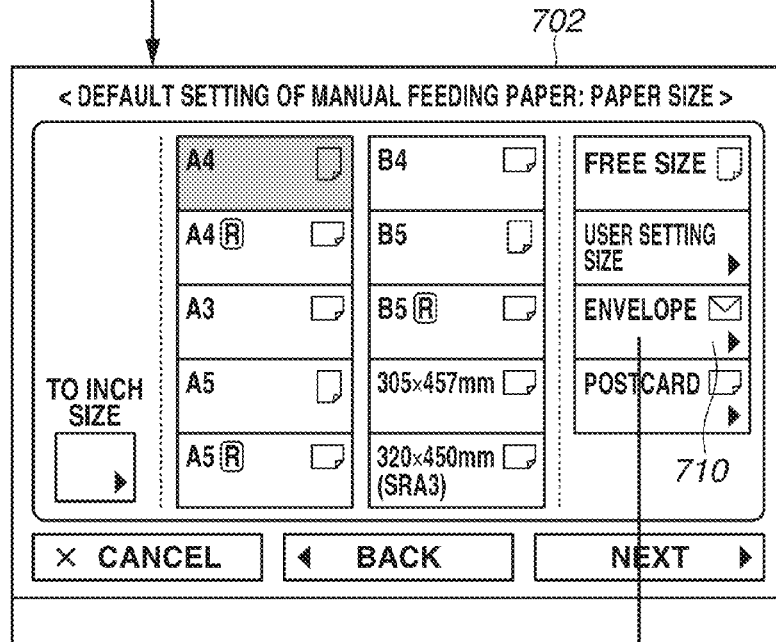

When the user presses the registration/editing key 709, a screen illustrated in FIG. 12B can be displayed on the operation unit 170.

The screen illustrated in FIG. 12B includes regular paper size keys (e.g., A4 size, B5 size, and A5 size keys) and an envelope key 710. A user can select a size to be registered from the screen illustrated in FIG. 12B. For example, if the user wants to register a regular paper size, the user can press a desired regular paper size button and then press the Next button. The paper size (e.g., A4 size, B5 size, or A5 size) corresponding to the pressed regular paper size button can be registered in the HDD 204. On the other hand, if the user wants to register an envelope size, the user can press the envelope key 710.

Figure 12C:
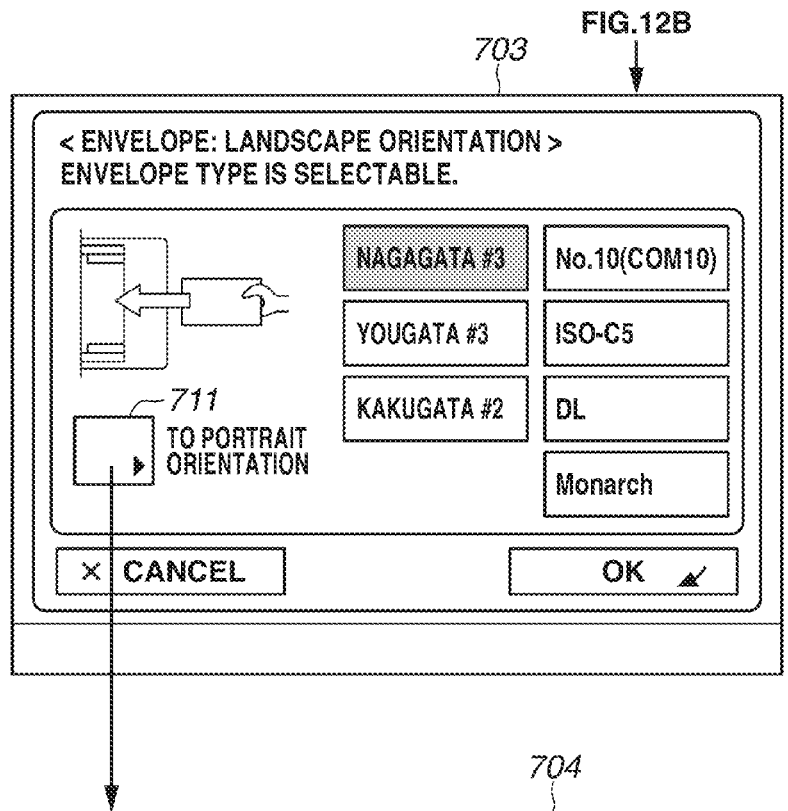

If the envelope key 710 is pressed, a screen illustrated in FIG. 12C can be displayed on the operation unit 170. The information displayed on the screen illustrated in FIG. 12C includes an envelope size list including Nagagata #3 and No. 10. The screen illustrated in FIG. 12C is usable when the envelope is placed in such a way as to position the short side of the envelope on the leading side in the conveyance direction (namely, when the envelope placement direction is the landscape orientation). If the user selects an envelope size to be registered and presses the OK key, the CPU 201 stores the selected envelope size and information indicating that the envelope placement direction is the landscape orientation, as information about the P1 key, in the HDD 204. Then, the CPU 201 causes the operation unit 170 to display a screen illustrated in FIG. 12F.

Figure 12D:
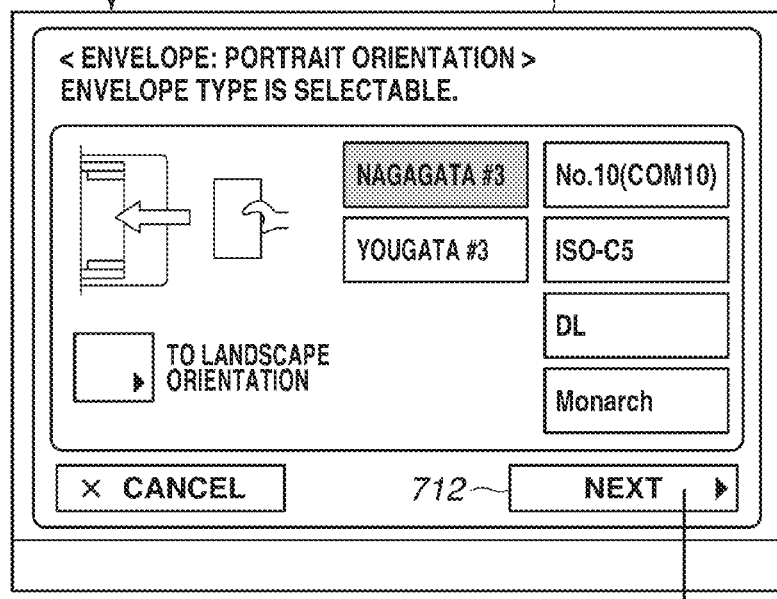

On the other hand, when a user wants to place an envelope in such a way as to position the long side of the envelope on the leading side in the conveyance direction (namely, when the envelope placement direction is the portrait orientation), the user presses a portrait orientation key 711 to cause the operation unit 170 to display a screen illustrated in FIG. 12D.

The information displayed on the screen illustrated in FIG. 12D includes a list of various envelope sizes (including Nagagata #3 and No. 10 envelope). The screen illustrated in FIG. 12D is usable when the envelope is placed in such a way as to position the long side of the envelope on the leading side in the conveyance direction (namely, when the envelope placement direction is the portrait orientation).

If the user selects an envelope size to be registered and presses the Next key, the CPU 201 stores the selected envelope size and information indicating that the envelope placement direction is the portrait orientation, as information about the P1 key selected on the screen illustrated in FIG. 12A, in the HDD 204. Then, the CPU 201 causes the operation unit 170 to display a screen illustrated in FIG. 12E.

The screen illustrated in FIG. 12E enables a user to input an envelope flap size. The information displayed on the screen illustrated in FIG. 12E includes a presently set flap size value (20.0 mm), an acceptable flap size range, and a numeric keypad that is usable to input a flap size. The user can input a desired flap size by operating the displayed numeric keypad or the hard numeric keypad 6006 of the key input unit 6001. If the envelope flap is in a closed state, the user can input 0 mm as the flap size. If an OK key 713 is pressed, the CPU 201 stores the input flap size in the HDD 204 in association with the P1 key, and causes the operation unit 170 to display the screen illustrated in FIG. 12F.

If a Next key 714 is pressed on the screen illustrated in FIG. 12F, a screen illustrated in FIG. 12G can be displayed on the operation unit 170. The screen illustrated in FIG. 12G enables a user to input a type of the sheet having been placed on the manual feeding tray 151. There is a plurality of types of envelopes that are similar in size and are different in grammage. Therefore, it is necessary to change the temperature of the fixing unit 327 or the conveyance speed of the envelope according to the grammage. Accordingly, the information displayed on the screen illustrated in FIG. 12G includes a list of sheet types in association with individual grammage values to enable the user to select a desired sheet type. If an OK key 615 is pressed after the sheet type has been selected on the screen illustrated in FIG. 12G, the CPU 201 stores the selected sheet type information in association with the P1 key in the HDD 204 and causes the operation unit 170 to display a screen illustrated in FIG. 12H.

The information displayed on the screen illustrated in FIG. 12H indicates that the sheet size is Nagagata #3, the registered sheet placement direction is the portrait orientation, and the registered sheet type is the envelope, as information registered to the P1 key.

Similar to the above-mentioned registration of sheet size/type information to the P1 key, size/type information about another frequently used sheet can be registered to each of the P2 to P6 keys.

As mentioned above, when a sheet is placed on the manual feeding tray 151, the MFP 100 reads and displays information about the envelope size and the flap size registered in association with the P1 to P6 keys, to enable a user to select desired values with respect to the sheet size and the sheet type.

Therefore, when a user places a sheet on the manual feeding tray 151, the user can select any one of the P1 to P6 keys as a frequently used sheet via the screen displayed on the operation unit 170.

Next, an operation that can be performed by the CPU 201 when a sheet is placed on the manual feeding tray 151 after a sheet size designation method is registered beforehand according to the above-mentioned method is described in detail below with reference to a flowchart illustrated in FIG. 13. To realize each processing of the flowchart illustrated in FIG. 13, the CPU 201 executes a program stored in the ROM 203. The CPU 201 starts processing of the flowchart illustrated in FIG. 13 in response to the placement of the sheet on the manual feeding tray 151.

First, in step S8000, the CPU 201 determines whether the sheet size designation method presently registered is the fixed mode. If it is determined that the presently registered designation method is the fixed mode (YES in step S8000), the operation proceeds to step S8001. If it is determined that the presently registered designation method is not the fixed mode (NO in step S8000), the operation proceeds to step S8040.

In step S8001, the CPU 201 reads the sheet size information from the HDD 204 that has been registered according to the method described with reference to FIGS. 11A to 11H.

In step S8002, the CPU 201 determines whether the registered sheet size is the envelope (e.g., Nagagata #3 or No. 10) size. If it is determined that the registered sheet size is the envelope size (YES in step S8002), the operation proceeds to step S8003. If it is determined that the registered sheet size is not the envelope size (No in step S8002), the operation proceeds to step S8011.

In step S8003, the CPU 201 determines whether the stored envelope placement direction is the portrait orientation based on the information registered in the HDD 204. If it is determined that the registered replacement information is the portrait orientation (YES in step S8003), the operation proceeds to step S8004. If it is determined that the registered replacement information is not the portrait orientation (NO in step S8003), the operation proceeds to step S8011.

When the operation proceeds to step S8011, the CPU 201 detects the guide width (i.e., the clearance between the guide 152 and the guide 153) of the manual feeding tray 151 based on a signal from the sensor 150.

In step S8012, the CPU 201 determines the sheet length in the main scanning direction based on the sheet size having been read in step S8001. For example, if the sheet size is the A4 size and the sheet placement direction is the portrait orientation, the size information "short side: 210 mm, long side: 297 mm" is stored in the ROM 203. Therefore, the CPU 201 identifies that the portrait sheet length in the main scanning direction is 297 mm. Further, if the sheet size is the A4 size and the sheet placement direction is the landscape orientation, the CPU 201 determines that the landscape sheet length in the main scanning direction is 210 mm based on the size information "short side: 210 mm, long side: 297 mm" stored in the ROM 203.

On the other hand, if the selected sheet size is the Nagagata #3 envelope, the CPU 201 determines that the envelope length in the main scanning direction is 120 mm with reference to the size information "short side: 120 mm, long side: 235 mm" stored in the ROM 203, because the processing in step S8011 is performed when the envelope placement direction is the landscape orientation. Then, the CPU 201 calculates a difference by subtracting the clearance between the guide 152 and the guide 153 detected in step S8005 from the determined sheet length in the main scanning direction. Then, the operation proceeds to step S8007.

On the other hand, when the operation proceeds from step S8003 to step S8004, the CPU 201 reads the flap size value registered beforehand in the HDD 204 as a value to be used in the fixed mode.

In step S8005, the CPU 201 detects the guide width (i.e., the clearance between the guide 152 and the guide 153) of the manual feeding tray 151 based on a signal from the sensor 150.

In step S8006, the CPU 201 determines the envelope length in the main scanning direction based on the envelope size having been read in step S8001. For example, if the envelope size is the Nagagata #3 envelope, the size information (short side: 120 mm, long side: 235 mm) is stored in the ROM 203. Therefore, the CPU 201 determines that the portrait envelope length in the main scanning direction is 235 mm. Then, the CPU 201 calculates a difference by subtracting the clearance between the guide 152 and the guide 153 detected in step S8005 from a sum of the determined envelope length in the main scanning direction and the flap length read in step S8004.

In step S8007, the CPU 201 determines whether the difference calculated in step S8006 or step S8012 exceeds a predetermined threshold value (e.g., 10 mm). The threshold value (e.g., 10 mm) is equivalent to an allowable gap between the sheet placed on the manual feeding tray 151 and the guide 152 or the guide 153. The threshold value can be stored beforehand in the ROM 203 at the time of factory shipment of the MFP 100 or can be stored in the HDD 204 so that a user can arbitrarily change the threshold value via the operation unit 170 or the PC 111. If it is determined that the calculated difference does not exceed the threshold value (NO in step S8007), the operation proceeds to step S8008. If it is determined that the calculated difference exceeds the threshold value (YES in step S8007), the operation proceeds to step S8009.

In step S8008, the CPU 201 determines the sheet size having been read in step S8001 and the flap size value having been read in step S8004, as information about the sheet placed on the manual feeding tray 151. Then, the CPU 201 terminates the processing of the flowchart illustrated in FIG. 13.

When the operation proceeds from step S8007 to step S8009, the CPU 201 causes the operation unit 170 to display the guide error screen illustrated in FIG. 9. Then, the CPU 201 terminates the processing of the flowchart illustrated in FIG. 13. The guide error screen illustrated in FIG. 9 includes a message that informs inconsistency between the guide width and the designated size and encourages a user to adjust the guide width.

Next, when the operation proceeds from step S8000 to step S8040, the CPU 201 performs processing in the following manner.

In step S8040, the CPU 201 determines whether a job is already received and the print processing is in a stopped state because no sheet is stored in the cassette 161 or the manual feeding tray 151 by executing the received job. If it is determined that the print processing is in a stopped state (YES in step S8040), the operation proceeds to step S8041. If it is determined that the print processing of the job is not in a stopped state (NO in step S8040), the operation proceeds to step S8020.

In step S8041, the CPU 201 identifies sheet attribute information having been set in the job. The attribute information includes information indicating the sheet size or the sheet type. Further, when the sheet size is an envelope size, the job setting may include a flap size setting or not include the flap size setting.

Figure 15:
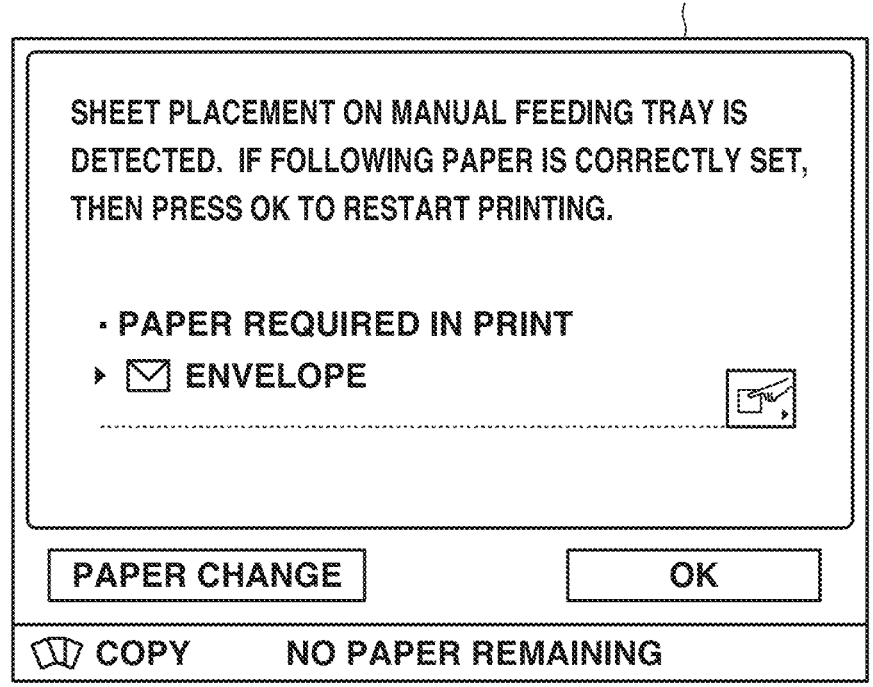
FIG. 15 illustrates an operation screen according to the second exemplary embodiment.
Figure 16A:
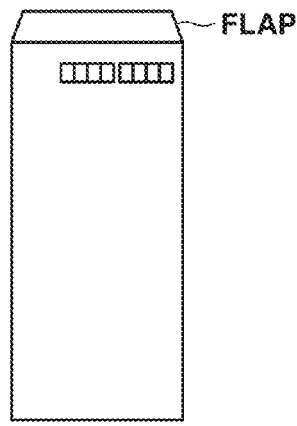
FIG. 16A illustrates an envelope and FIGS. 16B and 16C illustrate example placements of the envelope.
Figure 16B:
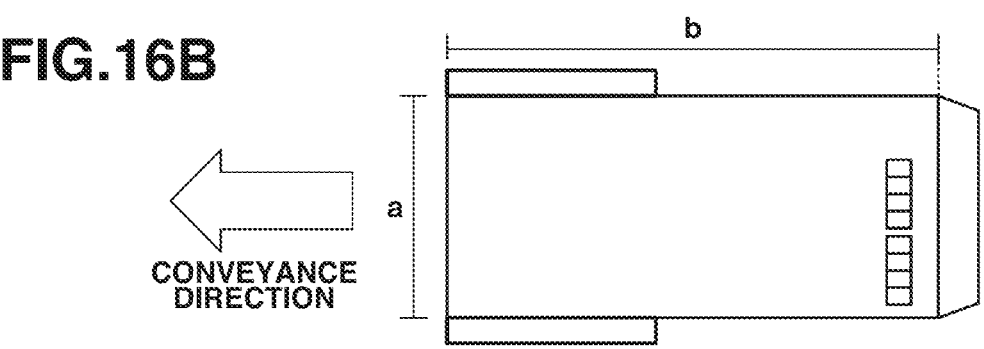
Figure 16C:
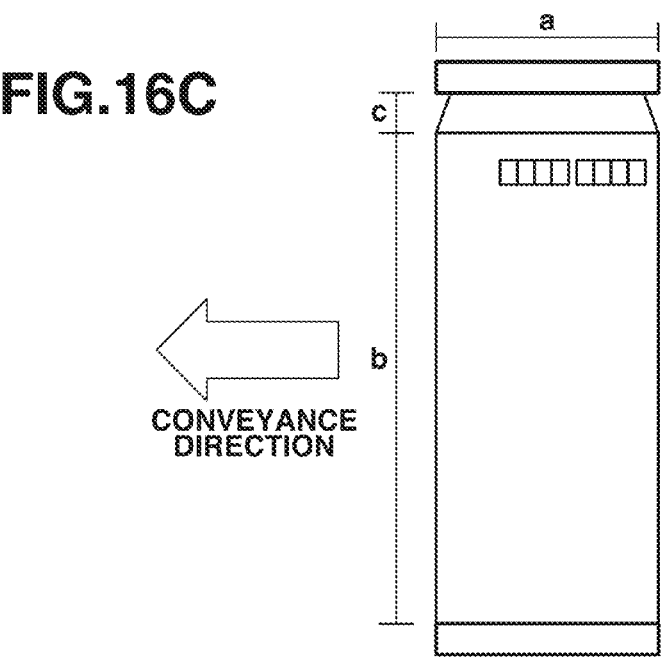

In step S8042, the CPU 201 causes the operation unit 170 to display a confirmation screen that indicates the sheet size included in the job setting, based on the identified attribute information. FIG. 15 illustrates an example of the confirmation screen. FIG. 15 indicates that the sheet size included in the job setting is an envelope. The confirmation screen illustrated in FIG. 15 can include not only the above-mentioned envelope information but also other information (e.g., portrait or landscape orientation or flap size) included in the job setting.

Further, if the sheet size included in the job setting is the A4 size, information indicating the A4 size can be displayed on the confirmation screen. If the sheet size included in the job setting is the B5 size, information indicating the B5 size can be displayed on the confirmation screen. A user can press a determining key (an OK key illustrated in FIG. 15) if the size displayed on the confirmation screen is acceptable.

In step S8043, the CPU 201 determines whether the determining key has been pressed. If it is determined that the determining key has been pressed (YES in step S8043), the operation proceeds to step S8044. If it is determined that the determining key has not been pressed (NO in step S8043), the CPU 201 repeats the processing in step S8043.

In step S8044, the CPU 201 determines whether the sheet size identified in step S8041 coincides with an envelope. If it is determined that the identified sheet size coincides with an envelope (YES in step S8044), the operation proceeds to step S8045. If it is determined that the identified sheet size does not coincide with any envelope (NO in step S8044), the operation proceeds to step S8052.

In step S8045, the CPU 201 determines whether the registered placement included in the job setting is the portrait orientation. If it is determined that the registered placement direction is the portrait orientation (YES in step S8045), the operation proceeds to step S8046. If it is determined that the registered placement direction is not the portrait orientation (No in step S8045), the operation proceeds to step S8052.

In step S8052, the CPU 201 detects the guide width (i.e., the clearance between the guide 152 and the guide 153) of the manual feeding tray 151 based on a signal from the sensor 150.

In step S8053, the CPU 201 determines the envelope length in the main scanning direction based on the size identified in step S8041. For example, if the sheet size included in the job setting is the A4 size and the registered placement direction is the portrait orientation, the size information "short side: 210 mm, long side: 297 mm" is stored in the ROM 203. Therefore, the CPU 201 determines that the portrait sheet length in the main scanning direction is 297 mm. Further, if the sheet size included in the job setting is A4 size and the registered placement direction is the landscape orientation, the CPU 201 determines that the landscape sheet length in the main scanning direction is 210 mm with reference to the size information "short side: 210 mm, long side: 297 mm" stored in the ROM 203.

On the other hand, if the sheet size involved in the job setting is the Nagagata #3 envelope and the registered placement direction is the landscape orientation, the CPU 201 determines that the envelope length in the main scanning direction is 120 mm with reference to the size information "short side: 120 mm, long side: 235 mm" stored in the ROM 203. Then, the CPU 201 calculates a difference by subtracting the clearance between the guide 152 and the guide 153 detected in step S8052 from the determined sheet length in the main scanning direction. Then, the operation proceeds to step S8050.

On the other hand, when the operation proceeds from step S8045 to step S8046, the CPU 201 detects the guide width (i.e., the clearance between the guide 152 and the guide 153) of the manual feeding tray 151 based on a signal from the sensor 150.

In step S8047, the CPU 201 determines whether the job settings include a flap size setting. If it is determined that the flap size setting is included (YES in step S8047), the operation proceeds to step S8048. If it is determined that flap size setting is not included (NO in step S8047), the operation proceeds to step S8049.

In step S8049, the CPU 201 reads a previous flap size, which has been set to the manual feeding tray 151 before occurrence of paper absence with respect to the paper to be used in the received job, from the HDD 204 and sets the readout flap size as a flap size of the envelope placed on the manual feeding tray 151.

In step S8048, the CPU 201 determines the envelope length in the main scanning direction based on the size identified in step S8041. For example, if the envelope size is Nagagata #3, the data indicating that the short side is 120 mm and the long side is 235 mm is stored in the ROM 203. Therefore, the CPU 201 determines that the portrait envelope length in the main scanning direction is 235 mm. Then, the CPU 201 calculates a difference by subtracting the clearance between the guide 152 and the guide 153 detected in step S8005 from a sum of the determined envelope length in the main scanning direction and the flap length read in step S8004.

In step S8050, the CPU 201 determines whether the difference calculated in step S8048 or step S8053 exceeds a predetermined threshold value (e.g., 10 mm). The threshold value (e.g., 10 mm) is equivalent to an allowable gap between the sheet placed on the manual feeding tray 151 and the guide 152 or the guide 153. The threshold value can be stored beforehand in the ROM 203 at the time of factory shipment of the MFP 100 or can be stored in the HDD 204 so that a user can arbitrarily change the threshold value via the operation unit 170 or the PC 111. If it is determined that the difference does not exceed the threshold value (NO in step S8050), the operation proceeds to step S8051. If it is determined that the difference exceeds the threshold value (YES in step S8050), the operation proceeds to step S8054.

Figure 13B:
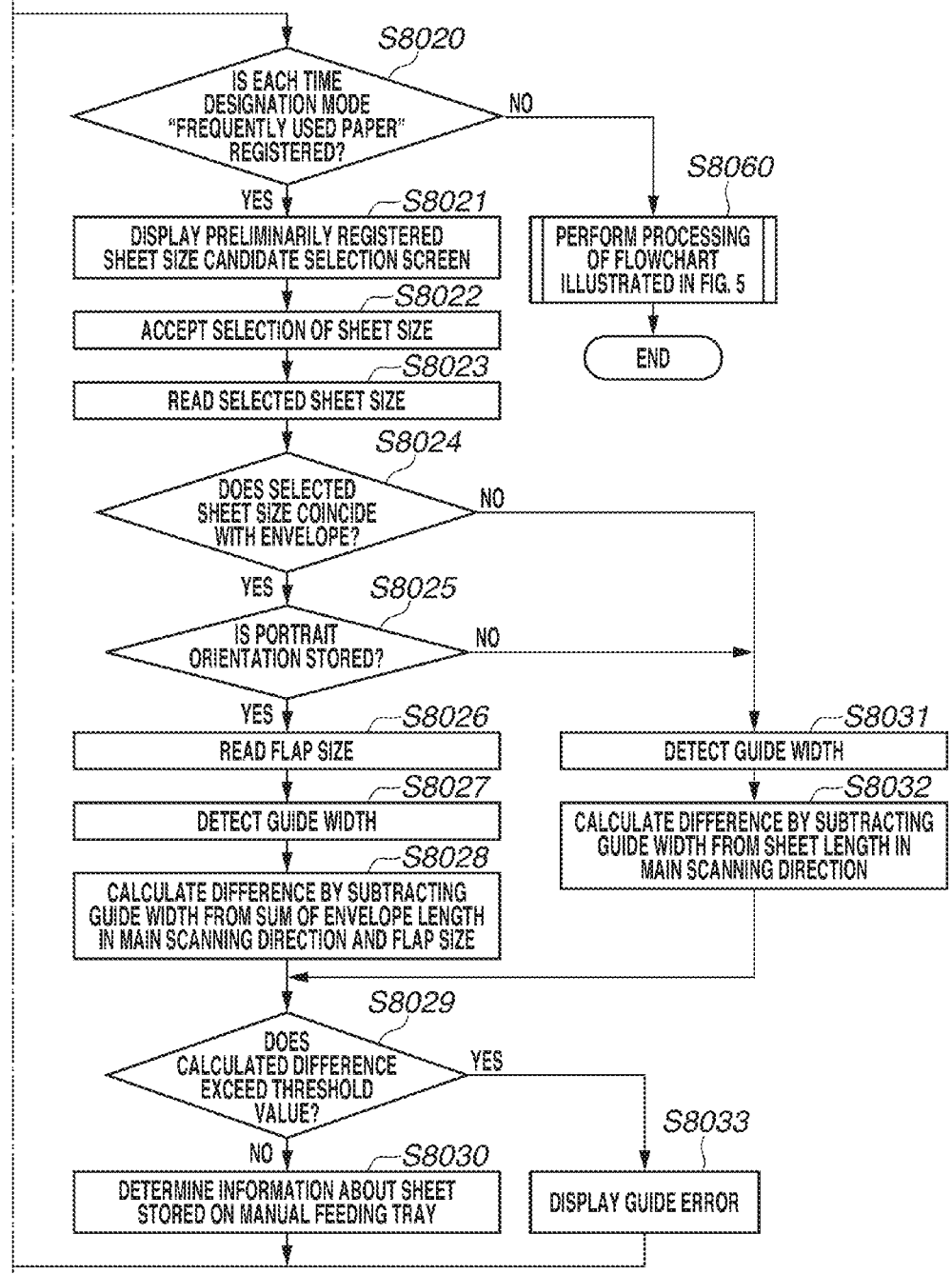

In step S8051, the CPU 201 determines the values relating to sheet size/type and flap size identified in step S8041, as information about the sheet placed on the manual feeding tray 151, and terminates the processing illustrated in FIG. 13.

When the operation proceeds from step S8050 to step S8054, the CPU 201 causes the operation unit 170 to display the guide error screen illustrated in FIG. 9 and terminates the processing of the flowchart illustrated in FIG. 13. The guide error screen illustrated in FIG. 9 includes a message that informs inconsistency between the guide width and the designated size and encourages a user to adjust the guide width.

Next, when the operation proceeds from step S8040 to step S8020, the CPU 201 performs processing in the following manner.

In step S8020, the CPU 201 determines whether the sheet size designation method presently registered is the each time designation mode (frequently used paper). If it is determined that the presently registered sheet size designation method is the each time designation mode (frequently used paper) (YES in step S8020), the operation proceeds to step S8021. On the other hand, if it is determined that the presently registered sheet size designation method is not the each time designation mode (frequently used paper), more specifically, when the presently registered sheet size designation method is the each time designation mode (standard) (NO in step S8020), the operation proceeds to step S8060. Processing to be performed in step S8060 is similar to the processing of the flowchart illustrated in FIG. 5 and therefore redundant description thereof will be avoided.

When the operation proceeds to step S8021, the CPU 201 causes the operation unit 170 to display a screen that enables a user to select a sheet size from a plurality of candidates registered beforehand as frequently used papers.

Figure 14C:
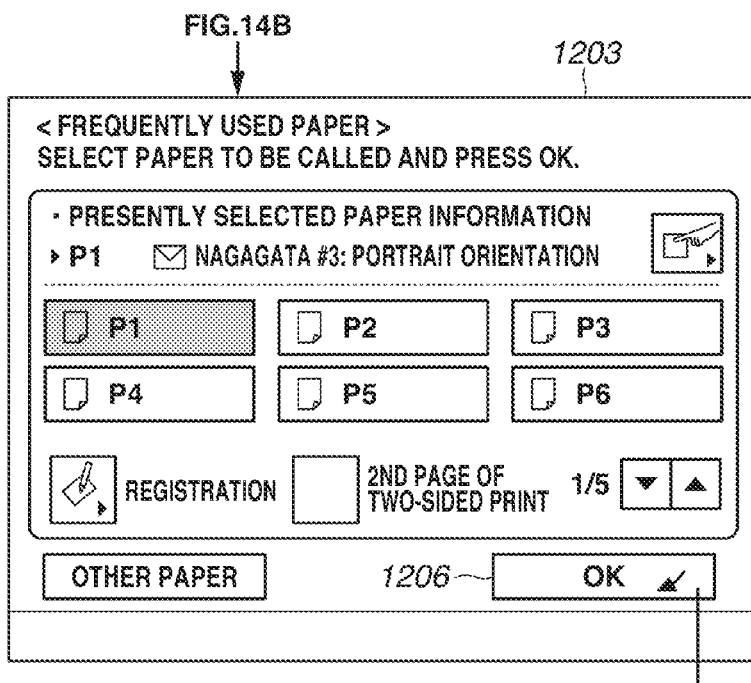
Figure 14D:
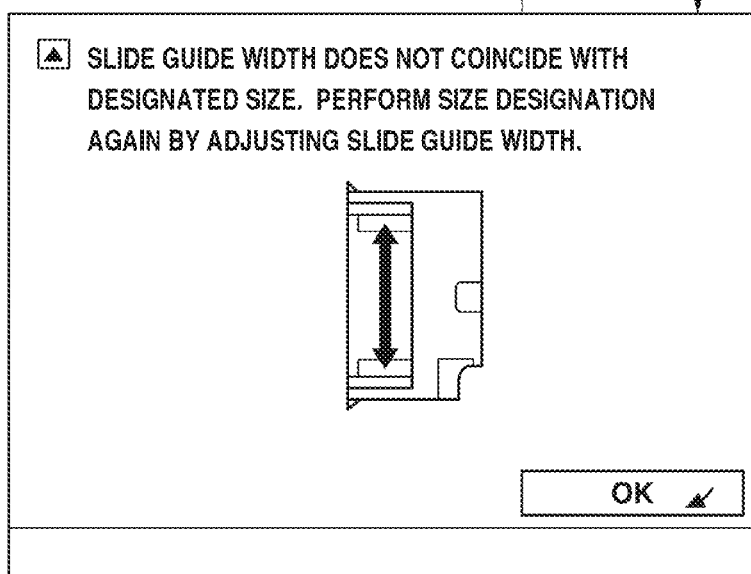

FIGS. 14A to 14D illustrate a screen transition with respect to the display on the operation unit 170 when the registered sheet size designation method is the each time designation mode (frequently used paper). FIG. 14A illustrates a screen 1201 that can be displayed on the operation unit 170 before a sheet is placed on the manual feeding tray 151.

If the placement of a paper on the manual feeding tray 151 is detected in a state where the screen 1201 is displayed, the CPU 201 causes the operation unit 170 to display a screen 1202 illustrated in FIG. 14B. The CPU 201 accepts information about the sheet size selected by a user via the screen 1202. The MFP 100 displays only the frequently used size information registered beforehand by the user, namely only a part of all sheet sizes that the MFP 100 can select in printing. Therefore, selecting a desired frequently used sheet is easy for the user.

In step S8023, the CPU 201 reads the sheet size selected by the user from the HDD 204. For example, if the CPU 201 detects the pressing of a "P1" key 1205 on the screen 1202, the CPU 201 reads sheet information (i.e., sheet size "Nagagata #3 (portrait orientation)", sheet type "envelope", and flap size "20.0 mm") registered beforehand in association with the P1 key 1205. Then, the CPU 201 causes the operation unit 170 to display a screen 1203 that includes the readout values.

Then, in step S8024, the CPU 201 determines whether the sheet size registered in association with the selected key corresponds to an envelope. If it is determined that the registered sheet size corresponds to an envelope (YES in step S8024), the operation proceeds to step S8025. If it is determined that the registered sheet size does not correspond to any envelope (NO in step S8024), the operation proceeds to step S8031.

In step S8025, the CPU 201 determines whether the registered sheet placement direction is the portrait orientation. If it is determined that the registered sheet placement direction is the portrait orientation (YES in step S8025), the operation proceeds to step S8026. If it is determined that the registered sheet placement direction is not the portrait orientation (NO in step S8025), the operation proceeds to step S8031.

In step S8031, the CPU 201 detects the guide width (i.e., the clearance between the guide 152 and the guide 153) of the manual feeding tray 151 based on a signal from the sensor 150.

In step S8032, the CPU 201 determines the sheet length in the main scanning direction based on the sheet size selected in step S8022. For example, if the selected sheet size is the A4 size and the sheet placement direction is the portrait orientation, the CPU 201 determines that the portrait sheet length in the main scanning direction is 297 mm because the size information "short side: 210 mm, long side: 297 mm" is stored in the ROM 203. Further, if the selected sheet size is the A4 size and the sheet placement direction is the landscape orientation, the CPU 201 determines that the landscape sheet length in the main scanning direction is 210 mm with reference to the size information "short side: 210 mm, long side: 297 mm" stored in the ROM 203.

On the other hand, if the selected sheet size is the Nagagata #3 envelope, the CPU 201 determines that the envelope length in the main scanning direction is 120 mm with reference to the size information "short side: 120 mm, long side: 235 mm" stored in the ROM 203, because the processing in step S8011 is performed when the envelope placement direction is the landscape orientation. Then, the CPU 201 calculates a difference by subtracting the clearance between the guide 152 and the guide 153 detected in step S8031 from the determined sheet length in the main scanning direction. Then, the operation proceeds to step S8029.

In step S8026, the CPU 201 reads a flap size registered in relation to the selected key from the HDD 204.

In step S8027, the CPU 201 detects the guide width (i.e., the clearance between the guide 152 and the guide 153) of the manual feeding tray 151 based on a signal from the sensor 150.

In step S8028, the CPU 201 identifies a difference by subtracting the guide width detected in step S8027 from a sum of the envelope length in the main scanning direction that can be identified based on the size having been read in step S8023 and the flap size having been read in step S8026.

In step S8029, it is determined whether the difference calculated in step S8028 or step S8032 exceeds a predetermined threshold value (e.g., 10 mm). The threshold value (e.g., 10 mm) is equivalent to an allowable gap. The threshold value can be stored beforehand in the ROM 203 at the time of factory shipment of the MFP 100 or can be stored in the HDD 204 so that a user can arbitrarily change the threshold value via the operation unit 170 or the PC 111. If it is determined that the calculated difference does not exceed the threshold value (NO in step S8029), the operation proceeds to step S8030. If it is determined that the calculated difference exceeds the threshold value (YES in step S8029), the operation proceeds to step S8033.

In step S8030, the CPU 201 determines the sheet size stored in the HDD 204, together with sheet information (e.g., sheet placement direction and flap size) if the sheet size coincides with an envelope, as information about the sheet placed on the manual feeding tray 151. Then, the CPU 201 terminates the processing of the flowchart illustrated in FIG. 7.

On the other hand, when the operation proceeds to step S8033, the CPU 201 causes the operation unit 170 to display the guide error screen illustrated in FIG. 9 and terminates the processing of the flowchart illustrated in FIG. 13. The guide error screen illustrated in FIG. 9 includes a message that informs inconsistency between the guide width and the designated size and encourages a user to adjust the guide width. The error message is not limited to the above-mentioned example that encourages a user to adjust the guide width. For example, it is useful to display a message that encourages the replacement of sheets.

After the information about the sheet placed on the manual feeding tray 151 has been determined in step S8008 or step S8030 illustrated in FIG. 13, the CPU 201 causes the MFP 100 to start the copy processing based on the determined sheet information in response to a print instruction accepted via the start key 6005 of the operation unit 170.

More specifically, the CPU 201 causes the reader unit 139 to read a document image and determines a print range of the read image based on the determined sheet size. The CPU 201 performs a control in such a way as to print an image on a sheet with reference to the determined print range.

Further, if the sheet size coincides with an envelope, the CPU 201 determines whether to rotate the image based on the determined sheet placement direction. More specifically, if the envelope placement direction is the portrait orientation, the CPU 201 controls the MFP 100 to perform printing on an envelope without rotating the document image. If the envelope placement direction is the landscape orientation, the CPU 201 rotates the image 90 degrees in the clockwise direction before the MFP 100 performs printing.

Further, if the sheet size coincides with an envelope and the sheet placement direction is the portrait orientation, the CPU 201 controls the MFP 100 to perform printing after shifting the image in the frontward direction illustrated in FIG. 5B by an amount corresponding to the flap size.

The print processing is performed not only based on the sheet information determined in the processing of step S8008 or step S8051 or the processing of step S8030 or step S8060 but also based on the settings (e.g., number of print copies and print layout) accepted via the operation unit 170.

On the other hand, after the error notification is displayed in step S8009, step S8054, or step S8033, if a print instruction is input via the start key 6005 of the operation unit 170 in a state where information about the sheet placed on the manual feeding tray 151 is not determined, the CPU 201 does not start the copy processing.

According to the present exemplary embodiment, a user can easily call and set information (e.g., size, placement, and flap) about an envelope placed on the manual feeding tray 151. Further, if the called sheet size is an envelope size and the sheet placement direction is the portrait orientation, the printing system determines whether to display a guide error screen considering the envelope flap size. Accordingly, the printing system according to the present exemplary embodiment can prevent a user from being confused by the display of the guide error screen even when the envelope is accurately positioned.

In the second exemplary embodiment, the MFP 100 is configured to perform various operations in a plurality of modes. However, the MFP 100 is not required to have all of the above-mentioned plurality of modes. For example, the MFP 100 can be configured to operate in one or two of the above-mentioned first to third modes (1) to (3), i.e., the fixed mode, the each time designation mode (standard), and the each time designation mode (frequently used paper) mode. Further, if it is determined that the fixed mode is not registered (NO in step S8000), the CPU 201 can skip the processing to be performed in step S8040 so that the operation can directly proceed to step S8020.

Other Exemplary Embodiment

As described in the first exemplary embodiment or in the second exemplary embodiment, the control apparatus 160 causes the operation unit 170 to display the envelope setting screen and accepts envelope settings from a user. However, the present invention is not limited to the above-mentioned examples. For example, the MFP 100 can be configured to control the PC 111 in such a way as to display the above-mentioned various setting screens on a display unit of the PC 111. Further, the MFP 100 can be configured to receive setting information accepted from a user via an operation unit of the PC 111. In this case, it is useful that a CPU of the PC 111 is configured to mainly perform controls for the above-mentioned display of various setting screens and the acceptance of print settings.

In this case, the PC 111 communicates with the MFP 100 to receive the clearance between the guide 152 and the guide 153 detected by the sensor 150 from the MFP 100. Then, the PC 111 accepts information from a user about envelope size and flap size to be used in the printing and determines the envelope size and the flap size. Subsequently, the PC 111 determines whether to perform an error notification display based on the received guide width and the envelope size and the flap size accepted and determined. If the PC 111 determines to perform the error notification display, the PC 111 causes the display unit of the PC 111 to perform error display processing.

The functions described using the flowcharts according to the above-mentioned exemplary embodiments can be realized by a computer, a personal computer, or any other processing apparatus (e.g., a CPU or a processor) that executes a software program acquired via a network or an appropriate storage medium.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-162232 filed Aug. 5, 2013, which is hereby incorporated by reference herein in its entirety.

What is claimed is:

1. A printing apparatus comprising:
a tray on which an envelope is stacked, the envelope having a flap and a body portion other than the flap;
a conveyance path configured to convey the envelope stacked on the tray;
a receiver configured to receive a print job;
an image forming unit configured to form an image on the envelope conveyed along the conveyance path in accordance with the print iob received by the receiver;
a first guide member and a second guide member provided on the tray, the first guide member and the second guide member regulating the envelope in a width direction orthogonal to a conveyance direction of the envelope;
a detector configured to detect a position of the first guide member; and
a controller configured to receive envelope information from an operation panel before the print iob is received, the envelope information including an orientation of the envelope stacked on the tray, a type of the envelope stacked on the tray, and a flap length of the envelope stacked on the tray,
wherein the orientation of the envelope includes either a first orientation in which the flap and the body portion of the envelope are aligned in the width direction or a second orientation in which the flap and the body portion are aligned in the conveyance direction,
wherein the controller is configured to determine a body length of the body portion in the width direction based on the orientation and the type of the envelope included in the envelope information received from the operation panel,
wherein the controller is configured to determine a guide length between the first guide member and the second guide member based on detection information from the detector,
wherein in a case where the orientation of the envelope included in the envelope information received from the operation panel corresponds to the first orientation, the controller controls the operation panel to display a warning message based on (a) the body length determined based on the type of the envelope included in the envelope information received from the operation panel, (b) the flap length included in the envelope information received from the operation panel, and (c) the guide length determined based on the detection information from the detector, and
wherein in a case where the orientation of the envelope included in the envelope information received from the operation panel corresponds to the second orientation, the controller controls the operation panel to display the warning message based on (a) the body length determined based on the type of the envelope included in the envelope information received from the operation panel and (c) the guide length determined based on the detection information from the detector, regardless of the flap length of the envelope.

2. The printing apparatus according to claim 1, wherein, in a case where the first orientation is designated as the orientation of the envelope and a difference between the guide length and a sum of the body length and the flap length exceeds a predetermined value, the controller controls the operation unit to display the warning message.

3. The printing apparatus according to claim 1, wherein the type of the envelope is selected from a plurality of candidates.

4. The printing apparatus according to claim 1, wherein the image forming unit is configured to form an image on the envelope according to a size of the body portion and the flap length.

5. The printing apparatus according to claim 4, wherein the image forming unit is configured to perform printing while shifting an image according to the flap length.

6. The printing apparatus according to claim 1, wherein the warning message is a message that prompts a user to adjust the first and second regulating members.

7. The printing apparatus according to claim 1, wherein the warning message is a message that prompts a user to stack an envelope having a correct size on the tray.

8. The printing apparatus according to claim 1, wherein the tray is a manual feeding tray.

9. The printing apparatus according to claim 1, wherein, in a case where the first orientation is designated as the orientation of the envelope and a difference between the guide length and a sum of the body length and the flap length does not exceed a predetermined value, the controller adopts the designated type of the envelope and the length of the flap.

10. The printing apparatus according to claim 1, wherein, in a case where the second orientation is designated as the orientation of the envelope and a difference between the body length and the guide length exceeds a predetermined value, the controller controls the operation unit to display the warning message.

11. The printing apparatus according to claim 1, wherein, in a case where the second orientation is designated as the orientation of the envelope and a difference between the body length and the guide length does not exceed a predetermined value, the controller adopts the designated type of the envelope and the length of the flap.

12. The printing apparatus according to claim 1, wherein the type of the envelope is a regular size.

13. The printing apparatus according to claim 1, wherein the envelope is stacked on the tray with the flap open.

14. The printing apparatus according to claim 1, wherein the second regulating member moves in response to the first regulating member being moved.

15. A method for controlling a printing apparatus, comprising:
    stacking an envelope on a tray, the envelope having a flap and a body portion other than the flap;
    conveying the envelope stacked on the tray along a conveyance path;
    receiving a print job;
    forming an image on the envelope conveyed along the conveyance path in accordance with the print job received;
    regulating the envelope in a width direction orthogonal to a conveyance direction of the envelop with a first guide member and a second guide member provided on the tray;
    detecting a position of the first guide member; and
    receiving envelope information from an operation panel before the print job is received, the envelope information including an orientation of the envelope stacked on the tray, a type of the envelope stacked on the tray, and a flap length of the envelope stacked on the tray,
        wherein the orientation of the envelope includes either a first orientation in which the flap and the body portion of the envelope are aligned in the width direction or a second orientation in which the flap and the body portion are aligned in the conveyance direction,
    determining a body length of the body portion in the width direction based on the orientation and the type of the envelope included in the envelope information received from the operation panel,
    determining a guide length between the first guide member and the second guide member based on detection information,
    when the orientation of the envelope included in the envelope information received from the operation panel corresponds to the first orientation, the operation panel displays a warning message based on (a) the body length determined based on the type of the envelope included in the envelope information received from the operation panel, the flap length included in the envelope information received from the operation panel, and (c) the guide length determined based on the detection information, and
    when the orientation of the envelope included in the envelope information received from the operation panel corresponds to the second orientation, the operation panel displays the warning message based on (a) the body length determined based on the type of the envelope included in the envelope information received from the operation panel and (c) the guide length determined based on the detection information, regardless of the flap length of the envelope.

16. A non-transitory storage medium storing a program that enables a computer to execute a method for controlling a printing apparatus, the program comprising:
    computer-executable instructions for stacking an envelope on a tray, the envelope having a flap and a body portion other than the flap;
    computer-executable instructions for conveying the envelope stacked on the tray along a conveyance path;
    computer-executable instructions for receiving a print job;
    computer-executable instructions for forming an image on the envelope conveyed along the conveyance path in accordance with the print job received;
    computer-executable instructions for regulating the envelope in a width direction orthogonal to a conveyance direction of the envelop with a first guide member and a second guide member provided on the tray;
    computer-executable instructions for detecting a position of the first guide member; and
    computer-executable instructions for receiving envelope information from an operation panel before the print job is received, the envelope information including an orientation of the envelope stacked on the tray, a type of the envelope stacked on the tray, and a flap length of the envelope stacked on the tray, wherein the orientation of the envelope includes either a first orientation in which the flap and the body portion of the envelope are aligned in the width direction or a second orientation in which the flap and the body portion are aligned in the conveyance direction, determining a body length of the body portion in the width direction based on the orientation and the type of the envelope included in the envelope information received from the operation panel, determining a guide length between the first guide member and the second guide member based on detection information, when the orientation of the envelope included in the envelope information received from the operation panel corresponds to the first orientation, the operation unit panel displays a warning message based on (a) the body length determined based on the type of the envelope included in the envelope information received from the operation panel, (b) the flap length included in the envelope information received from the operation panel, and (c) the guide length determined based on the detection information, and when the orientation of the envelope included in the envelope information received from the operation panel corresponds to the second orientation, the operation panel displays the warning message based on (a) the body length determined based on the type of the envelope included in the envelope information received from the operation panel and (c) the guide length determined based on the detection information, regardless of the flap length of the envelope.

\* \* \* \* \*